United States Patent
Blom et al.

(10) Patent No.: US 9,122,693 B2
(45) Date of Patent: Sep. 1, 2015

(54) METHOD AND APPARATUS FOR DETERMINING CONTEXTUALLY RELEVANT GEOGRAPHICAL LOCATIONS

(75) Inventors: Jan Otto Blom, Lutry (CH); Gian Paolo Perrucci, Lausanne (CH); Mats Lönngren, Helsinki (FI); Juha Kalevi Laurila, St-Legier (CH); Niko Tapani Kiukkonen, Veikkola (FI); Julien Eberle, Cugy (CH); Daniel Gatica-Perez, Lausanne (CH); Raul Montoliu-Colas, Castellón (ES); Julian Charles Nolan, Pully (CH)

(73) Assignee: Nokia Technologies Oy, Espoo (FI)

( * ) Notice: Subject to any disclaimer, the term of this patent is extended or adjusted under 35 U.S.C. 154(b) by 439 days.

(21) Appl. No.: 12/956,849

(22) Filed: Nov. 30, 2010

(65) Prior Publication Data

US 2012/0136865 A1 May 31, 2012

(51) Int. Cl.
G06F 17/30 (2006.01)
G06F 7/00 (2006.01)

(52) U.S. Cl.
CPC ...... *G06F 17/30141* (2013.01); *G06F 17/3087* (2013.01); *G06F 17/30241* (2013.01)

(58) Field of Classification Search
USPC .......................................................... 707/692
See application file for complete search history.

(56) References Cited

U.S. PATENT DOCUMENTS

| | | | |
|---|---|---|---|
| 4,853,852 A | 8/1989 | Rosen | |
| 6,115,655 A | 9/2000 | Keith et al. | |
| 6,456,234 B1 | 9/2002 | Johnson | |
| 7,032,188 B2 | 4/2006 | Salmimaa et al. | |
| 7,522,996 B2 | 4/2009 | Jung et al. | |
| 7,541,945 B2 | 6/2009 | Nakashima | |
| 7,558,696 B2 | 7/2009 | Vilppula et al. | |
| 7,720,844 B2 | 5/2010 | Chu et al. | |
| 2002/0023000 A1 | 2/2002 | Bollay | |
| 2002/0065605 A1 | 5/2002 | Yokota | |
| 2002/0164999 A1 | 11/2002 | Johnson | |

(Continued)

FOREIGN PATENT DOCUMENTS

| CA | 2583222 A1 | 5/2006 |
|---|---|---|
| CA | 2687036 A1 | 2/2009 |

(Continued)

OTHER PUBLICATIONS

International Search Report for related International Patent Application No. PCT/FI2011/050898 dated Jan. 16, 2012, pp. 1-4.

(Continued)

*Primary Examiner* — Kuen Lu
(74) *Attorney, Agent, or Firm* — Ditthavong & Steiner, P.C.

(57) ABSTRACT

An approach is provided for determining and utilizing geographical locations contextually relevant to a user. A contextually relevant location platform determines location-based data associated with a user and/or user device. The contextually relevant location platform determines stationary points based, at least in part, on the location-based data. The contextually relevant location platform determines context data associated with the stationary points. The contextually relevant location platform determines at least one location anchor based, at least in part, on the stationary points and the associated context data, wherein the at least one location anchor represents a bounded geographical area of contextual relevance to the user.

18 Claims, 24 Drawing Sheets

(56) References Cited

U.S. PATENT DOCUMENTS

| | | |
|---|---|---|
| 2004/0252051 A1 | 12/2004 | Johnson |
| 2005/0102098 A1 | 5/2005 | Montealegre et al. |
| 2006/0022048 A1 | 2/2006 | Johnson |
| 2006/0077055 A1 | 4/2006 | Basir |
| 2006/0089792 A1 | 4/2006 | Bandas |
| 2006/0149684 A1* | 7/2006 | Matsuura et al. ............... 705/65 |
| 2007/0005188 A1 | 1/2007 | Johnson |
| 2007/0115142 A1 | 5/2007 | Nakashima |
| 2007/0178913 A1 | 8/2007 | Niemenmaa et al. |
| 2007/0232326 A1 | 10/2007 | Johnson |
| 2007/0233387 A1 | 10/2007 | Johnson |
| 2007/0233388 A1 | 10/2007 | Johnson |
| 2007/0276587 A1 | 11/2007 | Johnson |
| 2008/0030308 A1 | 2/2008 | Johnson |
| 2008/0086264 A1 | 4/2008 | Fisher |
| 2009/0012955 A1 | 1/2009 | Chu et al. |
| 2009/0031006 A1 | 1/2009 | Johnson |
| 2009/0100363 A1 | 4/2009 | Pegg et al. |
| 2009/0271271 A1 | 10/2009 | Johnson |
| 2009/0299857 A1* | 12/2009 | Brubaker ................... 705/14.66 |
| 2010/0036834 A1 | 2/2010 | Bandas |
| 2010/0076968 A1* | 3/2010 | Boyns et al. ................... 707/732 |
| 2010/0131584 A1 | 5/2010 | Johnson |
| 2010/0185605 A1 | 7/2010 | Chu et al. |
| 2010/0191454 A1 | 7/2010 | Shirai et al. |
| 2010/0207782 A1 | 8/2010 | Johnson |
| 2012/0005023 A1* | 1/2012 | Graff ......................... 705/14.58 |
| 2012/0083285 A1* | 4/2012 | Shatsky et al. ............. 455/456.1 |

FOREIGN PATENT DOCUMENTS

| | | |
|---|---|---|
| CA | 2678315 A1 | 3/2010 |
| CN | 101454639 A | 6/2009 |
| EP | 0 926 591 A1 | 6/1999 |
| EP | 1 805 486 A | 7/2007 |
| JP | 11-160088 A | 6/1999 |
| JP | 2000-35341 | 2/2000 |
| JP | 2000-46576 | 2/2000 |
| JP | 2003-121189 A | 4/2003 |
| JP | 2004-233264 A | 8/2004 |
| JP | 2004-317222 A | 11/2004 |
| JP | 2004-347634 | 12/2004 |
| JP | 2005-321259 | 11/2005 |
| JP | 2005-352170 A | 12/2005 |
| JP | 9-222852 | 8/2007 |
| JP | 2007-213293 | 8/2007 |
| JP | 2008-518325 A | 5/2008 |
| JP | 2008-134458 | 6/2008 |
| WO | WO 01/38826 A1 | 5/2001 |
| WO | WO 2005/048199 A1 | 5/2005 |
| WO | WO 2006/047213 A2 | 5/2006 |
| WO | WO 2009/005827 A1 | 1/2009 |
| WO | WO 2009/0154482 A1 | 2/2009 |

OTHER PUBLICATIONS

International Written Opinion for related International Patent Application No. PCT/FI2011/050898 dated Jan. 16, 2012, pp. 1-6.

U.S. Appl. No. 12/553,462, Sep. 3, 2009, Juha Henrik Arrasvuori.

Discovering Human Places of Interest from Multimodal Mobile Phone Data, Montoliu et al., MUM '10, Dec. 1-3, 2010, Limassol, Cyprus, pp. 1-10.

Discovering Personally Meaningful Places: An Interactive Clustering Approach, Zhou et al., ACM Transactions on Information Systems, vol. 25, No. 3, Article 12, Jul. 2007, pp. 1-31.

Discovering Semantically Meaningful Places from Pervasive RF-Beacons, Kim et al., UbiComp 2009, Sep. 30-Oct. 3, 2009, Orlando, Florida, USA, pp. 1-10.

Display a Google Calendar in Google Maps, Jan. 29, 20008, http://googlesystem.blogspot.com/2008/01/display-google-calendar-in-google-maps.html, pp. 1-5.

Enhancing the Location-Context Through Inference Over Positioning Data, Meneses et al., Proceedings of the Conference on Mobile and Ubiquitous Systems, Guimarães, Portugal, Jun. 29-30, 2006, pp. 1-10.

Identifying Meaningful Places, Nurmi, Petteri, 2009, https://www.doria.fi/bitstream/handle/10024/47626/identify.pdf?sequence=1, pp. 1-93.

Identifying Meaningful Places: The Non-parametric Way, Nurmi et al., Pervasive 2008, LNCS 5013, J. Indulska et al. (Eds.), 2008, pp. 111-127.

International search report and written opinion for corresponding international application No. PCT/FI2010/050649 dated Dec. 17, 2010, pp. 1-14.

\* cited by examiner

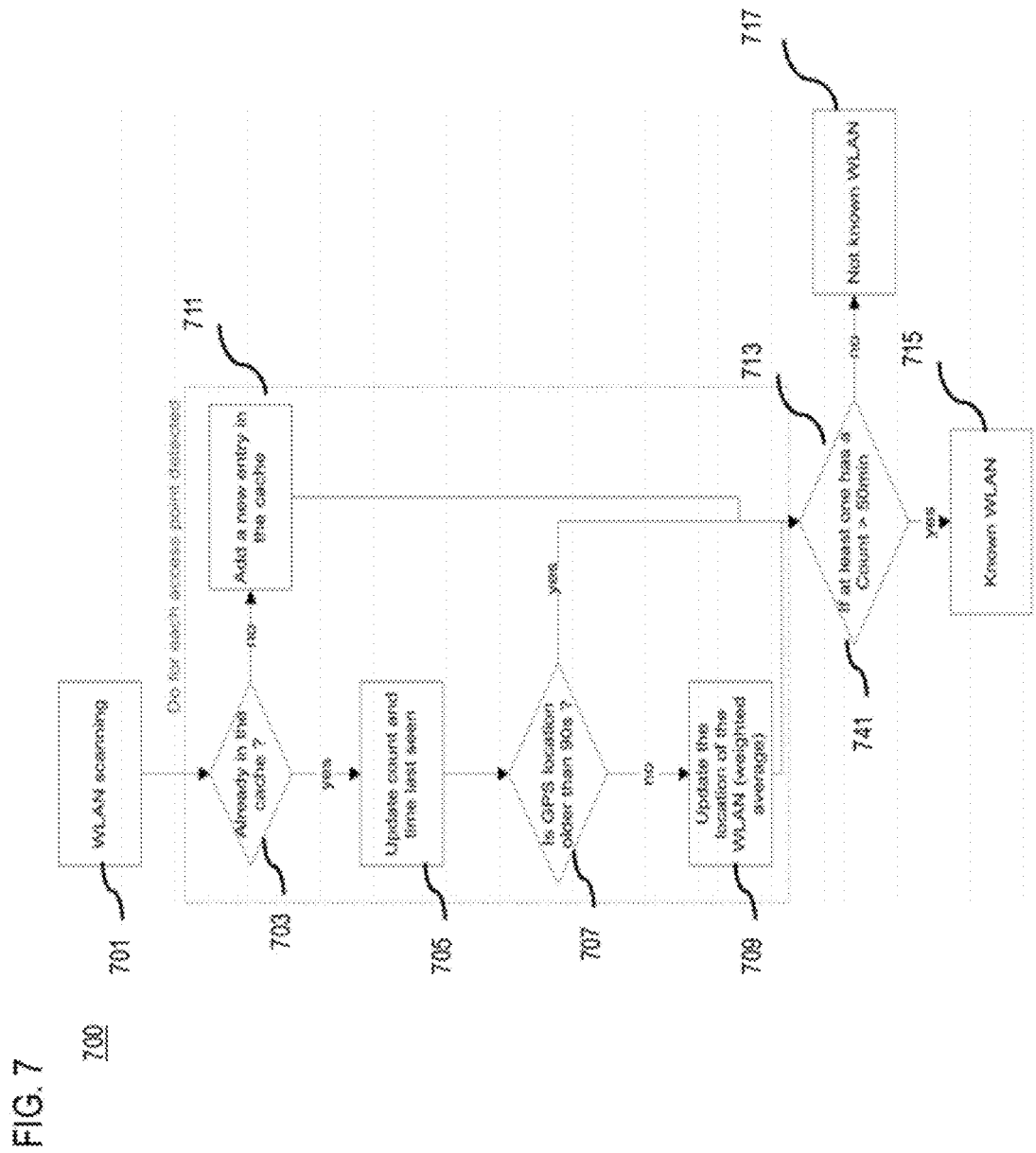

Algorithm 2 Algorithm for estimating stay regions from stay points

Require: $l_{sp} = \{\mathcal{R}_1, \ldots, \mathcal{R}_Q\}$: set of stay point lists.
Require: $D_{max}$: Distance threshold.
Ensure: $l_{sr}$: List of resulting stay regions.
  $SP \leftarrow \emptyset$;
  for $d \leftarrow 1 : Q$ do
    $SP \leftarrow SP \cup l_{sp}^d$;
  end for
  $l_{sr} \leftarrow Clustering(SP, D_{max})$;

1000

1100

1120

1220

1200

1240

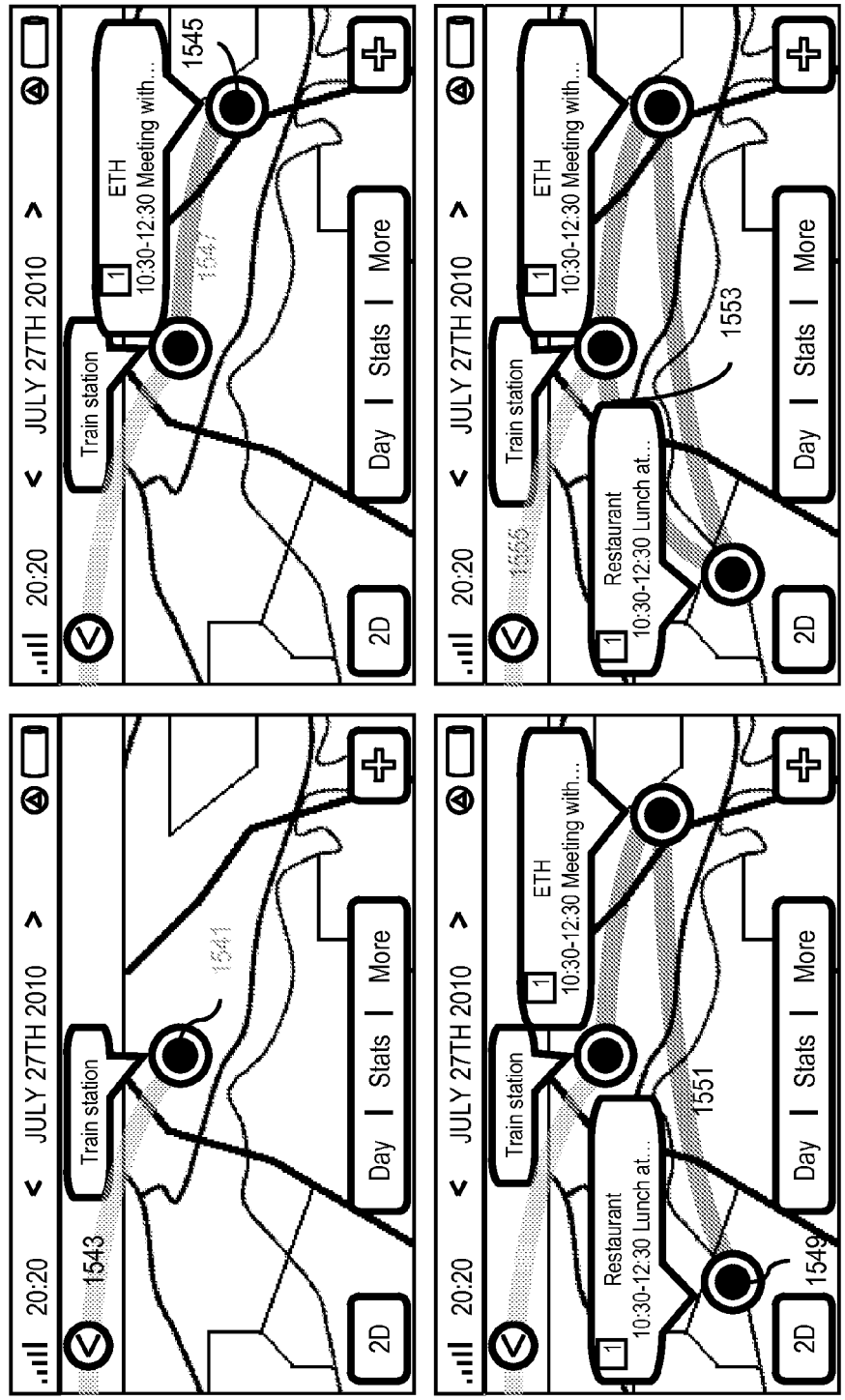

METHOD AND APPARATUS FOR DETERMINING CONTEXTUALLY RELEVANT GEOGRAPHICAL LOCATIONS

BACKGROUND

Service providers (e.g., wireless, cellular, Internet, content, social network, etc.) and device manufacturers are continually challenged to deliver value and convenience to consumers by, for example, offering information relevant to personal interest, preferences, etc. One area of interest has been the development of services and technologies for customizing location-based information that is specifically relevant to a user (e.g., data that are customized and presented for personal needs considering user life style). However, the existing methods for automatically determining places of interest, such as geometry-based and fingerprint-based methods, generally are based on searching in pre-existing databases and/or geo-coordinate mappings of such places. Accordingly, service providers and device manufacturers are challenged to develop new mechanisms for effectively and efficiently determining geographical locations relevant to a particular user's daily life and utilizing those geographical locations of interest and related information.

Some Example Embodiments

Therefore, there is a need for an approach for determining and utilizing geographical locations contextually relevant to a user.

According to one embodiment, a method comprises determining location-based data associated with a user, at least one device associated with the user, or a combination thereof. The method also comprises determining a plurality of stationary points based, at least in part, on the location-based data. The method further comprises determining context data associated with the plurality of stationary points. The method further comprises determining at least one location anchor based, at least in part, on the plurality of stationary points and the associated context data, wherein the at least one location anchor represents a bounded geographical area of contextual relevance to the user.

According to another embodiment, an apparatus comprises at least one processor, and at least one memory including computer program code, the at least one memory and the computer program code configured to, with the at least one processor, cause, at least in part, the apparatus to determine location-based data associated with a user, at least one device associated with the user, or a combination thereof. The apparatus is also caused to determine a plurality of stationary points based, at least in part, on the location-based data. The apparatus is further caused to determine context data associated with the plurality of stationary points. The apparatus is further caused to determine at least one location anchor based, at least in part, on the plurality of stationary points and the associated context data, wherein the at least one location anchor represents a bounded geographical area of contextual relevance to the user.

According to another embodiment, a computer-readable storage medium carries one or more sequences of one or more instructions which, when executed by one or more processors, cause, at least in part, an apparatus to determine location-based data associated with a user, at least one device associated with the user, or a combination thereof. The apparatus is also caused to determine a plurality of stationary points based, at least in part, on the location-based data. The apparatus is further caused to determine context data associated with the plurality of stationary points. The apparatus is further caused to determine at least one location anchor based, at least in part, on the plurality of stationary points and the associated context data, wherein the at least one location anchor represents a bounded geographical area of contextual relevance to the user.

According to another embodiment, an apparatus comprises means for determining location-based data associated with a user, at least one device associated with the user, or a combination thereof. The apparatus also comprises means for determining a plurality of stationary points based, at least in part, on the location-based data. The apparatus further comprises means for determining context data associated with the plurality of stationary points. The apparatus further comprises means for determining at least one location anchor based, at least in part, on the plurality of stationary points and the associated context data, wherein the at least one location anchor represents a bounded geographical area of contextual relevance to the user.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 shows a known wireless local area network (WLAN) recognition algorithm, according to one embodiment;

FIG. 8 shows an algorithm for discovering stay points from location points, according to one embodiment;

FIG. 10 shows an algorithm for estimating location anchors for a user, according to one embodiment;

FIGS. 15A-15G are diagrams of user interfaces overlaying calendar information on top of one or more location anchors in a map, according to various embodiments;

DESCRIPTION OF SOME EMBODIMENTS

Examples of a method, apparatus, and computer program for determining geographical locations contextually relevant to a user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "location point" refers to a measurement of the instantaneous location of a user, e.g., a current location together with the timestamp when a sensor captures the location information. In one embodiment, a location point is represented using location coordinates and an associated timestamp, e.g., ([46.6N, 6.5E], [16:34:57]).

As used herein, the term "stay point" or "stationary point" refers to a cluster of location points from a predetermined period of time (e.g., a day, week, month, season, year, etc.) that represents a geographic region in which the user remains substantially stationary for some predetermined period of time. For example, a stay point is represented using the coordinates of the centroid of the cluster and the time interval when the user arrived and left the stay point, e.g., ([46.6N, 6.5E], [16:30:00], [17:54:34]).

As used herein, the term "location anchor" refers to a cluster of stay points or stationary points associated with the same semantic meaning or context. By way of example, it is contemplated that the clustering of the stay points may be based, at least in part, on temporal and/or spatial clustering. In one embodiment, a location anchor is represented using the coordinates of the centroid of the cluster and the minimum and maximum coordinates of the stay points belonging to the cluster, e.g., ([46.6N, 6.5E], [46.595N, −46.599N], [6.498E, 6.502E]). In some embodiments, a location anchor can be represented by a predetermined shape or boundary (e.g., rectangle, circle, oval, triangle, etc.) centered at the centroid of the cluster whose size depends on the minimum and maximum coordinates. By way of example, a location anchor may be represented by any various shapes overlapped onto the relevant cluster of stay points. As used herein, the term "stay region" is used as a synonym of "location anchor".

Although various embodiments are described with respect to estimating a location anchor via continuous real-time sampling location points, it is contemplated that the approach described herein may be implemented via processing location points in batch processes.

Figure 1:
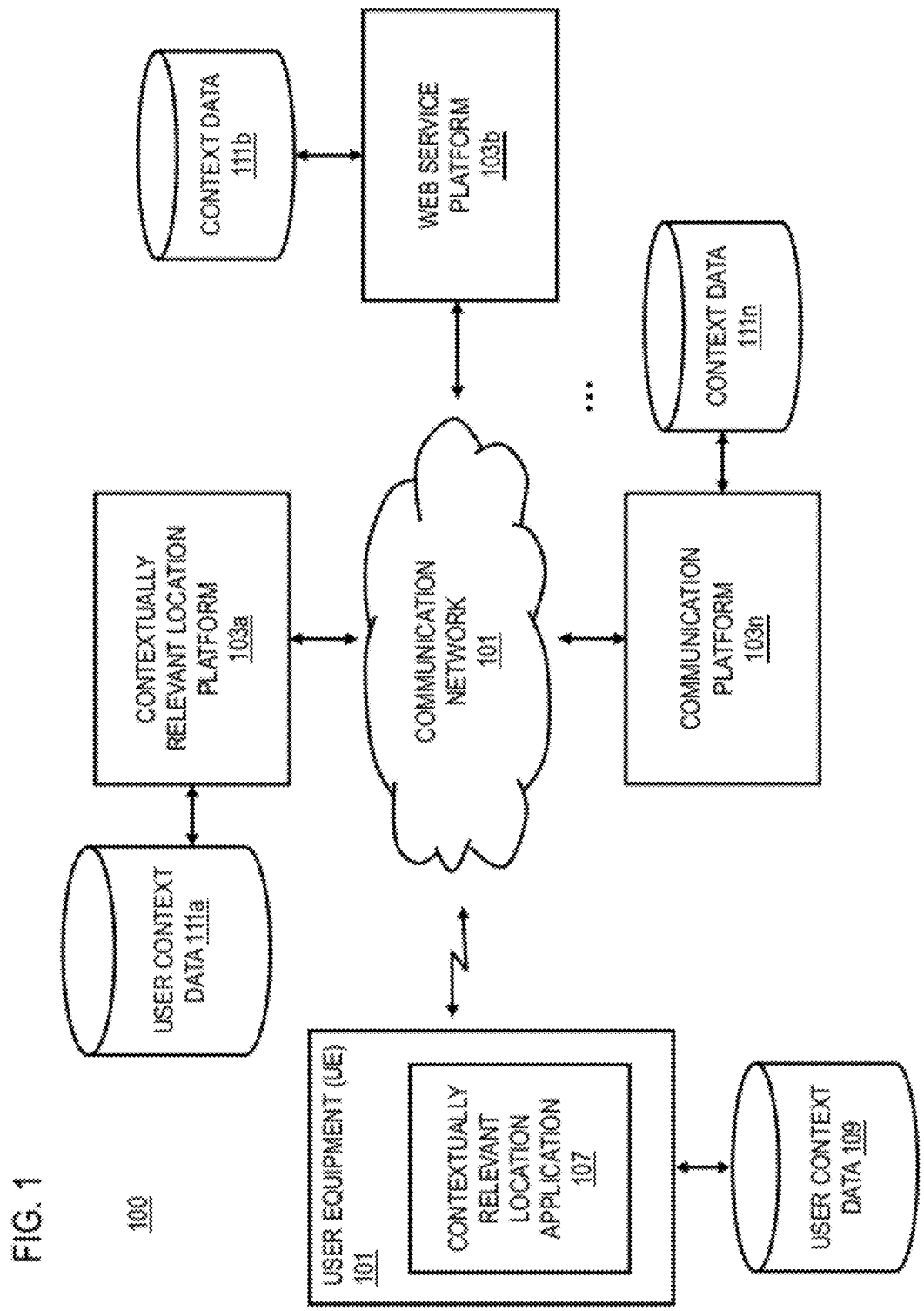
FIG. 1 is a diagram of a system capable of determining and utilizing geographical locations contextually relevant to a user, according to one embodiment.

FIG. 1 is a diagram of a system capable of determining and utilizing geographical locations contextually relevant to a user, according to one embodiment. It is becoming increasingly popular for users to share personal location information via social networking services, such as FourSquare® and Gowalla®. Although mobile phones are equipped with sensors for automatic recognition of personally relevant locations, these services require user interaction to determine the points of interest.

To address this problem, a system 100 of FIG. 1 introduces the capability to automatically recognize personally relevant locations and to present the information to the user across a variety of use cases and applications, without conscious intervention by the user. After collecting location data and relevant context data, the system 100 clusters location data to derive location anchors, e.g., places that are frequently visited by the user in an energy efficient way. The system 100 then utilizes and presents the location anchors to the user in a way meaningful to the user's daily life.

As shown in FIG. 1, the system 100 comprises a user equipment (UE) 101 having connectivity to a contextually relevant location platform 103a, a web service platform 103b, and a communication platform 103n via a communication network 105. The contextually relevant location platform 103a discovers stay points and estimates the location anchors based upon context data and/or user contact data. The user context data may include user events, user content items, location-based context data (e.g., time stamps, etc.). For example, the context data contains environment data, weather data, traffic data, event data, commuter data, etc. As an example, the user contextual data of a user interested in technology or gadgets may be associated with electronics stores, wireless hot spots in the city, computer conventions, forums of technologies, science museums, media laboratories, etc. The web service platform 103b collects, assembles, stores, updates, and/or supplies the context data and user context data. In one embodiment, user events may be extracted from calendars, emails, voice messages, text messages, blogs, bulletin boards, discussion forums, geographic information systems, and social network websites. In another embodiment, user content items may be used to infer context data and may be retrieved from, for instance, personal photo albums, media libraries, playlists, etc. In one embodiment, a communication platform 103n processes the context data and user context data of different formats and types including data derived various forms of communication such as emails, text messages, voice messages, calls, video/audio clips, etc.

In the example of FIG. 1, each of the platforms 103a-103n and the UE 101 are connected to their own databases to access particular types of data related to the execution of their respective functions. For example, the contextually relevant location platform 103a is connected to a user context database 111a, the web service platform 103b is connected to a context data database 111b, the communication platform 103n is connected to a context data database 111n, and the UE 101 is connected to a user context database 109. In one embodiment, the contextually relevant location platform 103a, the web service platform 103b, and the communication platform 103n can be implemented via shared or partially shared hardware equipment or different hardware equipment.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the system 100 includes a client program that runs on the UE 101 to collect location point data, and a server to process the location point data in conjunction with the text data and/or user text data stored locally or at a back-end database. In addition or alternatively, the location point data and/or related context data may be processed entirely within the UE 101 and no data is shared with an external platform or back-end server. In various embodiments of the approach described herein, the stay points are extracted or determined from the location point data. In other words, the system 100 filters the location point data (e.g., raw location-based data associated with the location of the UE 101 and/or its associated user) to determine only those location point data that indicate where the user remains substantially stationary over a predetermined period of time (e.g., the stay points). Then the system 100 determines rich contextual data (e.g., time, date, activity, etc.) associated with the user and the stay points to determine one or more location anchor points. These location anchor points, for instance, represent a bounded geographical area of contextual relevance to the user (e.g., favorite places, frequented locations, etc.) In one embodiment, a client executing at the UE 101 stores stay point and location anchor data locally and uploads the information to a back-end database when a connection is available.

Once location anchors have been extracted, they are used in many applications. By way of example, the location anchors are used for a personal navigation application, to decrease the mental payload and improve the user experience. Typical interactions include planning navigation routes, car pools, calendar browsing, searching gasoline stations, searching battery charging locations, etc. In addition, users may be interested in sharing the location anchors generated for the user with other users (e.g., friends, social networking contacts, etc.) that show unique tacit knowledge and interests of physical locations of the user. In one example use case, a pastry chef may post on a social network website the location anchors of restaurants and shopping spots, to share with other pastry chefs.

By way of example, the UE 101, the contextually relevant location platform 103a, the web service platform 103b, and the communication platform 103n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
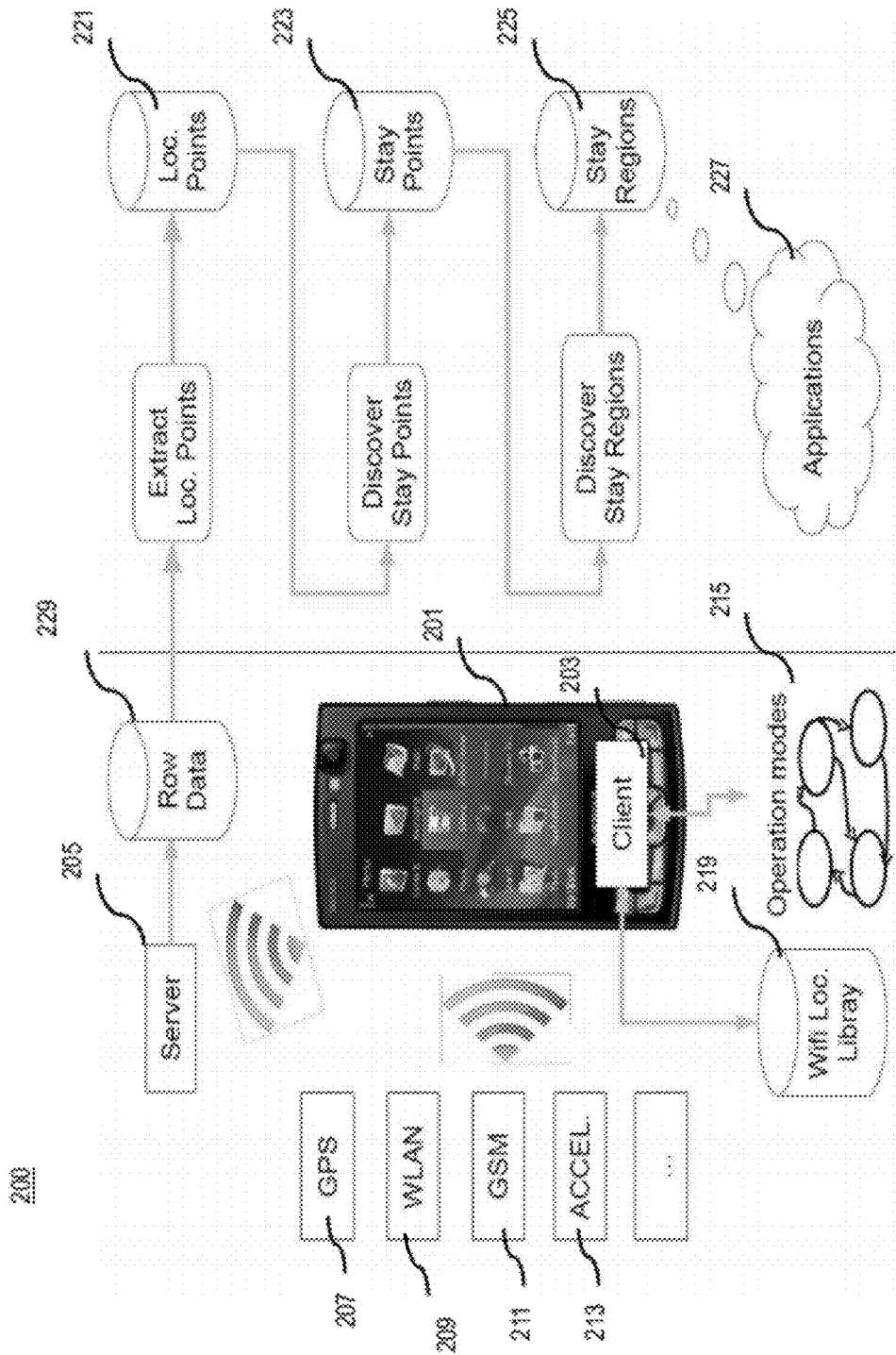
FIG. 2 is a data flow diagram for an approach of determining a geographical area contextually relevant to a user, according to one embodiment.

FIG. 2 is a data flow diagram for an approach 200 of determining a geographical area contextually relevant to a user, according to one embodiment. In one embodiment, determining location anchors depends on data that are obtained from one or more human activity sensors (e.g., GPS, accelerometer, etc.). The sensors may accompany the user or be incorporated within a UE 201 (e.g., smart phone, PDA, etc.). In FIG. 2, the UE 201 (e.g., a smart phone) is used to collect location data. In one embodiment, location data has been collected using a client-server system. The client 203 residing in the UE 201 records location data from a global positioning system (GPS) 207, a wireless local area network (WLAN) 209 (e.g., connected via WiFi, Bluetooth, infrared, etc.), a global system for mobile communications (GSM) 211, an accelerometer (ACCEL) 213, etc, with respect to user activities.

In one embodiment, the UE 201 continuously samples the context information from the plurality geographic location identification sources including GPS, A-GPS, accelerator meter, network based position system WLAN scanning, or a combination thereof, and determines a current state of the UE 201 as searching, GPS fix, or stationary, thereby determining a location point. Therefore, as the UE 201 switches among different modes/states 215, the location data is collected and recorded into a location library 217 available locally at the UE 201. In another embodiment, the context and/or location information can be determined on demand or as needed by the various embodiments of the approach described herein.

In another embodiment, the server 205 extracts location points from a raw location database 219 based upon a state determining approach (e.g., a location state) or other methods, and saves the location points into a location point database 221. The server 205 then discovers stay points from the location points and saves the stay points into a stay point database 223. In one embodiment, a user has to remain with a predetermined boundary of a candidate stay point for a minimum period of time for the candidate stay point to be designated as a stay point. Accordingly, in one embodiment, the size or boundary of the region and the minimum period of time are two parameters associated with determining the stay point as discussed later in conjunction with FIG. 5. In some embodiments, an additional parameter is introduced, which limits a time difference between two consecutive location points, to ensure all the consecutive location points included in a stay point are close in time. Thereafter, the server 205 estimates stay regions (e.g., location anchors) from the stay points and saves the stay regions into a stay region database 225. A clustering algorithm (e.g., a density-based method, a grid-based method, etc.) is used to estimate stay regions from stay points. Calculations concerning stay points and regions are made either locally at the UE 201 or externally.

In one embodiment, the server 205 may reside in the UE 201, the contextually relevant location platform 103a, the web service platform 103b, the communication platform 103n, or any node in the communication network 101. The server 205 may retrieve raw location data from the location library 217, the raw location database 219, the user context database 111a, the context data database 111b, the context data database 111n, the user context database 109, or a combination thereof. The raw location database 219, the location point database 221, the stay point database 223, and the stay region database 225 may reside separately or collectively in the UE 201, the contextually relevant location platform 103a, the web service platform 103b, the communication platform 103n, or any node in the communication network 101.

The location anchors can be applied to internal or external applications 227. The applications 227 include a wide range of local applications resided in the UE 201 and remote applications resided in the contextually relevant location platform 103a, the web service platform 103b, the communication platform 103n, or any node in the communication network 101.

For example, location anchors (e.g., home, office, gym, library, etc.) are displayed to the user in a location panel. As another example, device profile is personalized as a function of the location anchors (e.g., switching to a silent mode at home). In some embodiments, statistics related to the location anchors (e.g., web-browsing, media content, and/or device usage, etc.) are visualized to the user. Other example uses of location anchors include the following: (1) location anchors are visualized on a map on a given day relevant to the user from a particular aspect, (2) personal content residing on the UE 201 is organized based on location anchors, (3) location anchors are used for car pooling/sharing and/or other transportation services, (4) location based advertisings are triggered on the basis of location anchors, (5) different types of context sensitive surveys are administered to the user based upon location anchors, and (6) location anchors are fed to, e.g., social networking services, such as the Places feature on Facebook®, for providing location based services, etc. It is contemplated that location anchors can be determined and used for any application and/or service that are dependent on location information or location-based data.

Figure 3C:
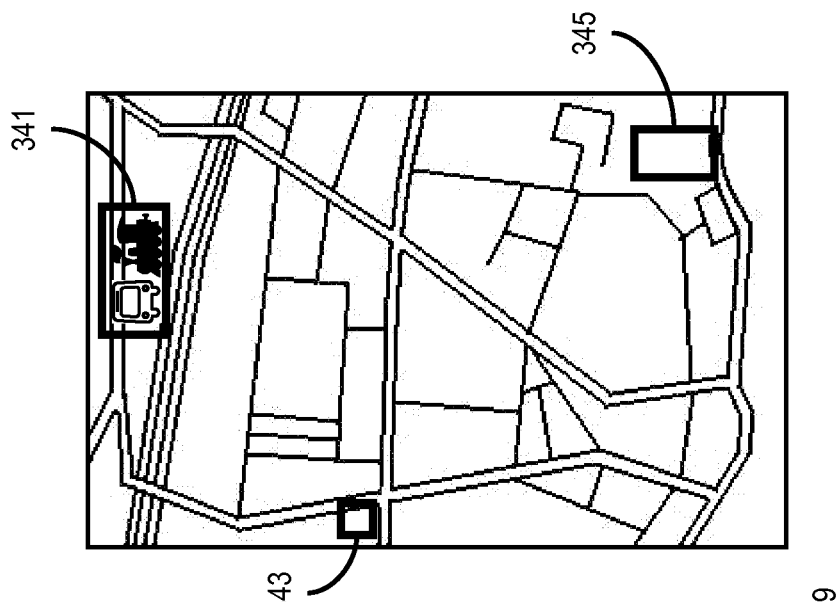
FIGS. 3A-3C show location points, stay points, and location anchors, according to one embodiment.
Figure 3B:
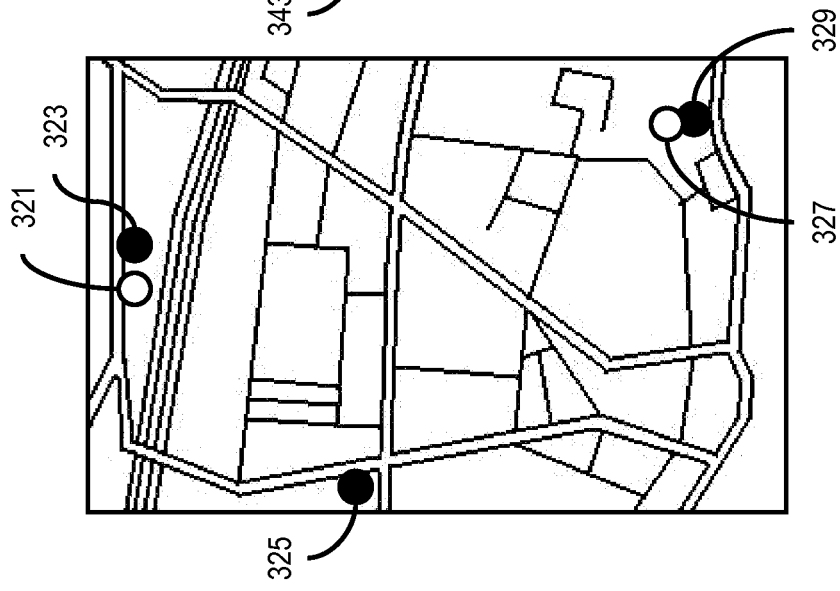
Figure 3A:
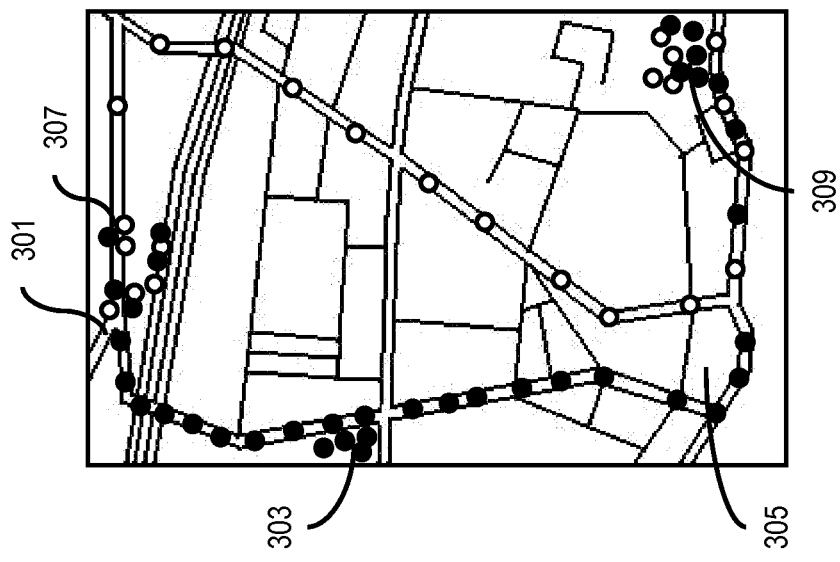

FIGS. 3A-3C show location points, stay points, and location anchors, according to one embodiment. As mentioned, location anchors can be displayed to the user in a location panel. In FIG. 3A, color-coded location points 301, 303, 305, 307, 309, etc, were extracted for a user visiting a European city. Each color corresponds to a different day, and the paths followed by the user are colored differently for the two days. FIG. 3B shows the stay points 321, 323, 325, 325, and 329 discovered for each day using the location points in FIG. 3A as input data. In this example, the user has stayed in the areas of Parc Olympique and the Lausanne train station on both days. On one of the two days, the user also has stayed in the area of the Parc de Milan. Under this scenario, the resulting stay points do not fall in the same coordinates, but represent the same semantic meaning, e.g., Parc Olympique and Lausanne train station. FIG. 3C shows the stay regions estimated using the stay points 341, 343, and 345.

Figure 4:
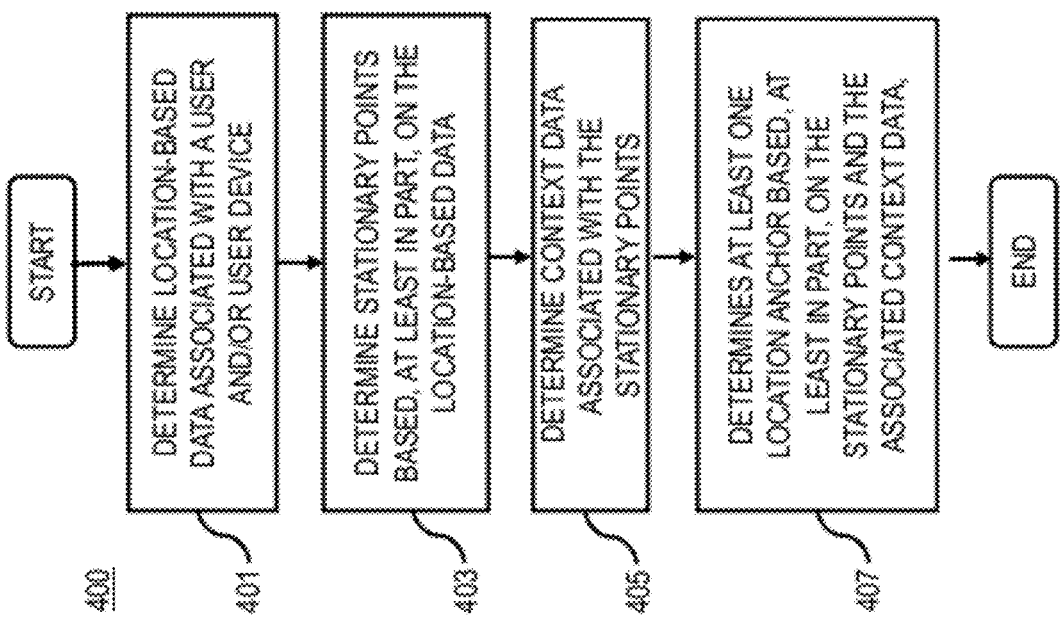
FIG. 4 is a flowchart of a process for determining geographical locations contextually relevant to a user, according to one embodiment.
Figure 18:
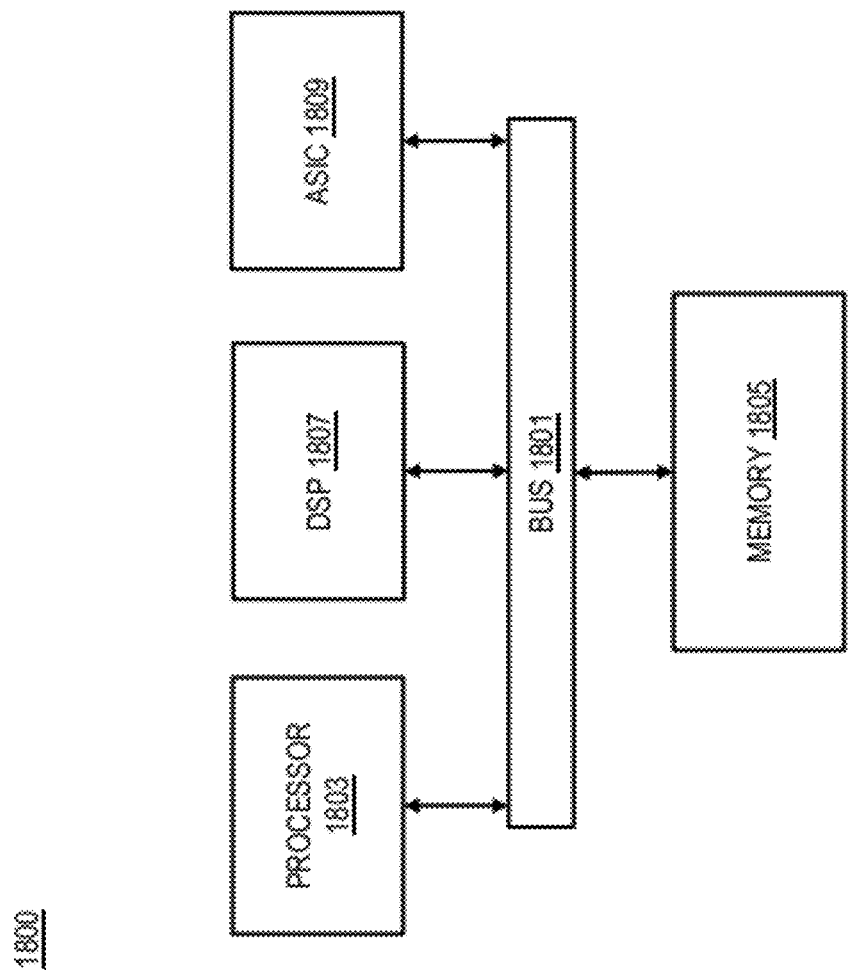
FIG. 18 is a diagram of a chip set that can be used to implement an embodiment of the invention.

FIG. 4 is a flowchart of a process for determining geographical locations contextually relevant to a user, according to one embodiment. In one embodiment, the contextually relevant location platform 103a performs the process 400 and is implemented in, for instance, a chip set including a processor and a memory as shown in FIG. 18. In step 401, the contextually relevant location platform 103a determines location-based data associated with the user (e.g., the location points that the user visited in FIG. 3A), at least one device associated with the user (e.g., the UE 101), or a combination thereof.

The contextually relevant location platform 103a determines a plurality of stationary points (e.g., the stay points in FIG. 3B) based, at least in part, on the location-based data, per Step 403. In one embodiment, the plurality of stationary points is determined from one or more locations indicated, at least in part, by the location-based data where the user, the at least one device, or a combination thereof is substantially stationary for a predetermined period of time continuously. In another embodiment, the plurality of stationary points is determined from the locations indicated where the user, the device, or a combination thereof is substantially stationary for a predetermined accumulated period of time (e.g., 2 hours) within a time frame (e.g., two days).

The contextually relevant location platform 103a determines context data (e.g., time stamps, time periods, accumulated time periods, etc.) associated with the plurality of stationary points (Step 405). The contextually relevant location platform 103a determines at least one location anchor (e.g., the stay regions in FIG. 3C) based, at least in part, on the plurality of stationary points and the associated context data (Step 407). In one embodiment, the contextually relevant location platform 103a determines one or more clusters of at least a portion of the stationary points within at least one predetermined boundary based, at least in part, on one or more predetermined criteria (e.g., a cluster size). The one or more predetermined criteria may include one or more temporal criteria (e.g., a length of user stay), one or more spatial criteria (e.g., a distance between two continuous location points), or a combination thereof.

The contextually relevant location platform 103a determines a respective contextual relevance (e.g., the user's stays) of the one or more clusters based, at least in part, on the associated context data. The contextually relevant location platform 103a determines the at least one location anchor based, at least in part, on the respective context relevance of the one or more clusters. The at least one location anchor represents a bounded geographical area (e.g., the rectangular area 341 corresponding to Lausanne train station in FIG. 3C) of contextual relevance to the user.

The contextually relevant location platform 103a determines content (e.g., news, music, etc.), functions (e.g., weather forecast, games, etc.), or a combination thereof associated with one or more applications, one or more services (e.g., social network services, consumer surveys, traffic alerts, etc.), or a combination thereof. The contextually relevant location platform 103a determines to cause, at least in part, transmission and presentation of the content, functions, or a combination thereof with respect to the at least one location anchor, for example, on the UE 101.

It is contemplated that the system 100 may use any mechanism to collect context data on a user with respect to an application associated with location anchors. For example, the system 100 automatically tracks the number of times a user visits geographic locations. The system 100 also collects context data on the user based on "physical visits" to the topic, point of interest or location. For example, the system 100 tracks the number of times the user physically visits a particular meeting/conference, point of interest or location (e.g., a gym) using location based services (e.g., GPS navigation and/or tracking, cellular triangulation), location markers or beacons at specific locations (e.g., radio frequency identification (RFID) tags, Bluetooth communication, WLAN communication), biometric reading (e.g., facial recognition via security cameras). In another embodiment, the system 100 processes media present on the UE 101 to determine a particular location based upon media content items (e.g., photos, videos, etc.). The location information is available, for instance, in a media content item tagged with the topic, point of interest or location information. In addition or alternatively, the system 100 automatically tracks the number of times a user visits website, blog, forum of a particular topic, etc. Or searches online for a point of interest or location (e.g., a gym), etc. Moreover, the system 100 evaluates the communication content (e.g., text messages, emails, audio messages, etc.) on the UE 101 to determine whether specific phrases tied to points of interests or locations. For example, the user may have a text message stating "I love That massage and That food." The system 100 interprets this message as a higher level of relevancy to the user's visits to That restaurants. The system 100 then determines a number of visits to That restaurants and relevant web resources, based upon the level of relevancy.

Figure 5:
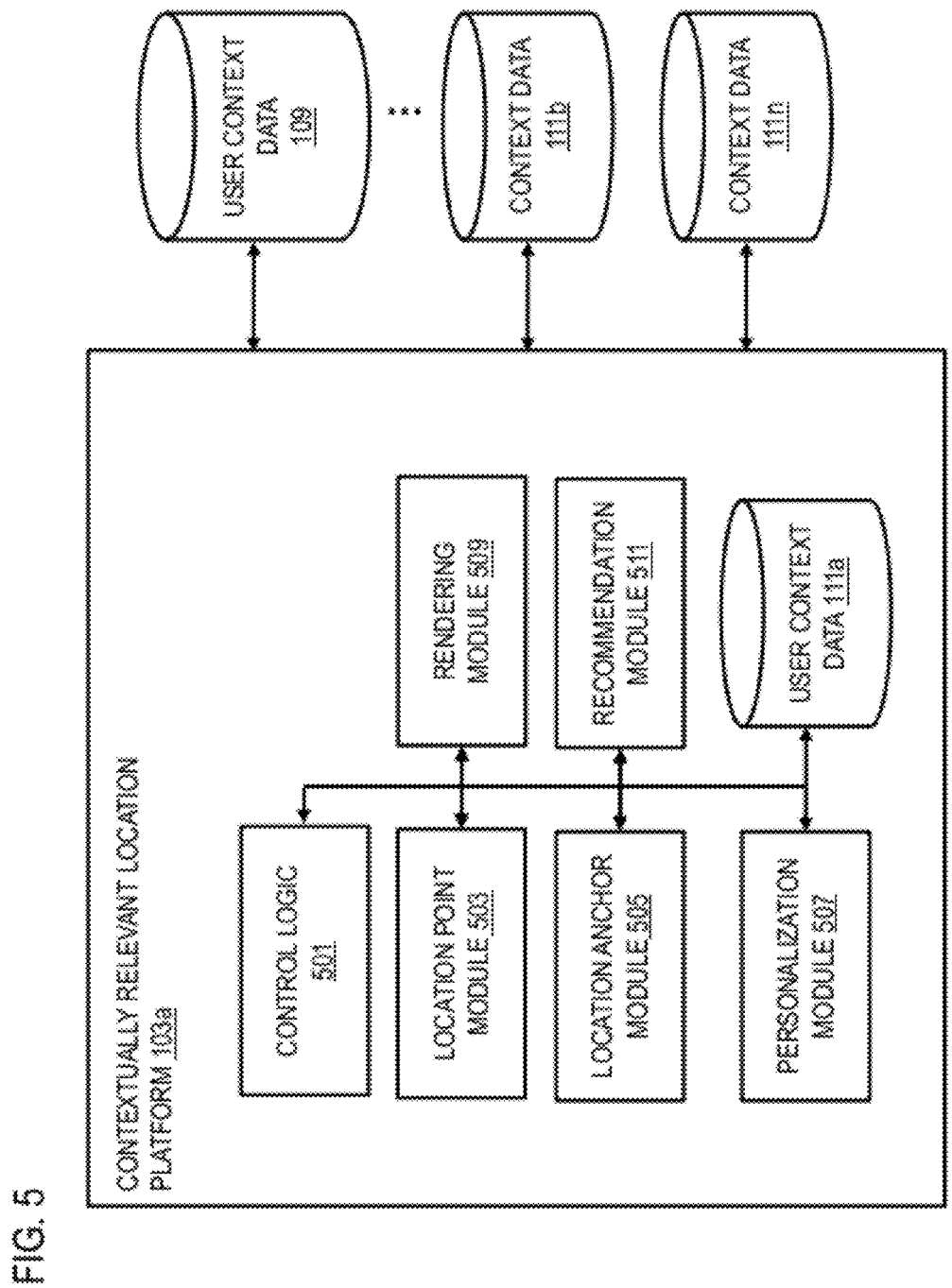
FIG. 5 is a diagram of the components of a contextually relevant location platform, according to one embodiment.

FIG. 5 is a diagram of the components of the contextually relevant location platform 103a, according to one embodiment. In this embodiment, the contextually relevant location platform 103a includes at least a control logic 501 which executes at least one algorithm for executing functions of the contextually relevant location platform 103a. By way of example, the contextually relevant location platform 103a operates at the middleware level of the UE 101 equipped with sensors. The contextually relevant location platform 103a includes a location point module 503 for determining location points according to various embodiments.

In one embodiment, the location point module 503 applies a deterministic asynchronous finite state detection algorithm to location based data, including but not limited to data of Cell-ID, GPS, accelerometer, W-LAN, etc., to determine location points for the user. The state detection algorithm is applied in order to optimize energy consumption associated with the tracking process. In one embodiment, the location point module 503 outputs continuous data concerning the location points of the user.

This location point data is fed to a location anchor module 505, whose task is to recognize personally relevant locations specific to that device/user known as location anchors. When a relatively large number of location data (e.g., GPS readings) are generated or made within a relatively small distance from one another, and within a short time interval, a location anchor is determined or formed.

In one embodiment, the shape of the location anchor (e.g., cluster) varies as a function of the geographic spread of the geo-coordinate (e.g., GPS) readings. Each location anchor is associated with at least the following attributes: (a) geographic dimensions (geo-coordinates of the center point, shape, etc.), (b) probability distribution across times of a day when the user is typically detected in that place, (c) probability distribution across days of a week/month/year when the user is typically detected in that place, and (d) history (cumulative times of staying in the place as well as records of incidents when the user has been detected within that particular location).

In one embodiment, the location anchor module 505 discovers stay points from the location points, and then estimates location anchors form the stay points. By way of example, for each day for the user, the UE 101 retrieves locally or downloads externally a list of consecutive location points lp=(p1, p2, pN), where N is the number of location points. Each location point pi is defined using a 3-tuple: pi=(lat, long, T) corresponding to latitude, longitude, and timestamp. In an alternative implementation, height h is included to define pi as a 4-tuple: (lat, long, h, T).

The location anchor module 505 discovers a list of stay points lsp=(sp1, sp2, spM) from location points by using the list of consecutive location points lp of a day for the user. M is the number of resulting stay points. Each stay point spj is defined using a 4-tuple: spj=(lat, long, Tstart, Tend) corresponding to the location and time when the stay point started and ended. In one embodiment, a stay point, extending from location point ps to location point pe exists, when the two following conventional constraints are fulfilled:

SpaceDistance (ps, pe)<Dmax,
TimeDifference(ps, pe)>Tmin,

Dmax and Tmin are two tuning parameters. Dmax is the maximum distance that the user can cover in a place to be considered as a stay point. Tmin is the minimum time that the user must be within the same place to be considered as a stay point. For instance, Dmax is 250 meters and Tmin is 50 minutes, respectively.

The following constraint Tmax for extracting stay points is introduced to limit a time difference between two consecutive location points (e.g., 10 minutes). In other words, all the consecutive location points belonging to a stay point must be close in time. The steps to estimate stay points from location points are resumed in detail in conjunction with FIGS. 8-9.

TimeDifference(pk, pk+1)<Tmax, for all k in [s,e−1].

Thereafter, the location anchor module 505 uses a clustering algorithm (e.g., a density-based method, a grid-based method, etc.) to estimate stay regions or location anchors from stay points. The steps to estimate stay regions are resumed in detail in conjunction with FIGS. 10-12.

The contextually relevant location platform 103a also includes a personalization module 507 for personalized applications for the user based upon the location anchors. The personalized applications will be discussed in detail in conjunction with FIGS. 13-17. The contextually relevant location platform 103a further includes a mapping module 507 for mapping the location anchors into different applications. By way of example, the personalization module 507 maps calendar events onto location anchors. A rendering module 509 of the contextually relevant location platform 103a then visualizes the calendar events on the map with respect to mapped location anchors. In another embodiment, the rendering module 509 further conveys a chronological order of the calendar events by showing the sequence of location anchors associated with a given day.

The contextually relevant location platform 103a further includes a recommendation module 511 for recommending one or more location anchors with respect to a particular application. By of example, in one use case, the recommendation module 511 recommends to the user the closest gasoline station when the user's gas tank is very low, or considering the user's gas usage profile.

Alternatively, the functions of the contextually relevant location platform 103a can be implemented via a contextually relevant location application (e.g., a widget) 107 in the UE 101 according to another embodiment. Widgets are lightweight applications, and provide a convenient means for presenting information and accessing services. It is contemplated that the functions of these components may be combined in one or more components or performed by other components of equivalent functionality. In this embodiment, the contextually relevant location application 107 includes modules similar to those of the contextually relevant location platform 103a, as previously described. To avoid data transmission costs as well as save time and battery, its control logic can fetch map and/or user interest data cached or stored in its own database, without requesting data from any servers or external platforms, such as the contextually relevant location platform 103a, the web service platform 103b and the communication platform 103n. Usually, if the UE 101 is online, data queries are made to online search server back-ends, and once the device is offline, searches are made to offline indexes locally.

In another embodiment, the contextually relevant location application 107 or the contextually relevant location platform 103a also monitor online activities to estimate location anchors for a user when the UE 101 transitions from an offline state to an online state. More specifically, by first monitoring offline activities, the application 107 or the platform 103 can immediately begin estimating location anchors for the UE 101 without collecting online records of the user's activities.

Figure 6A:
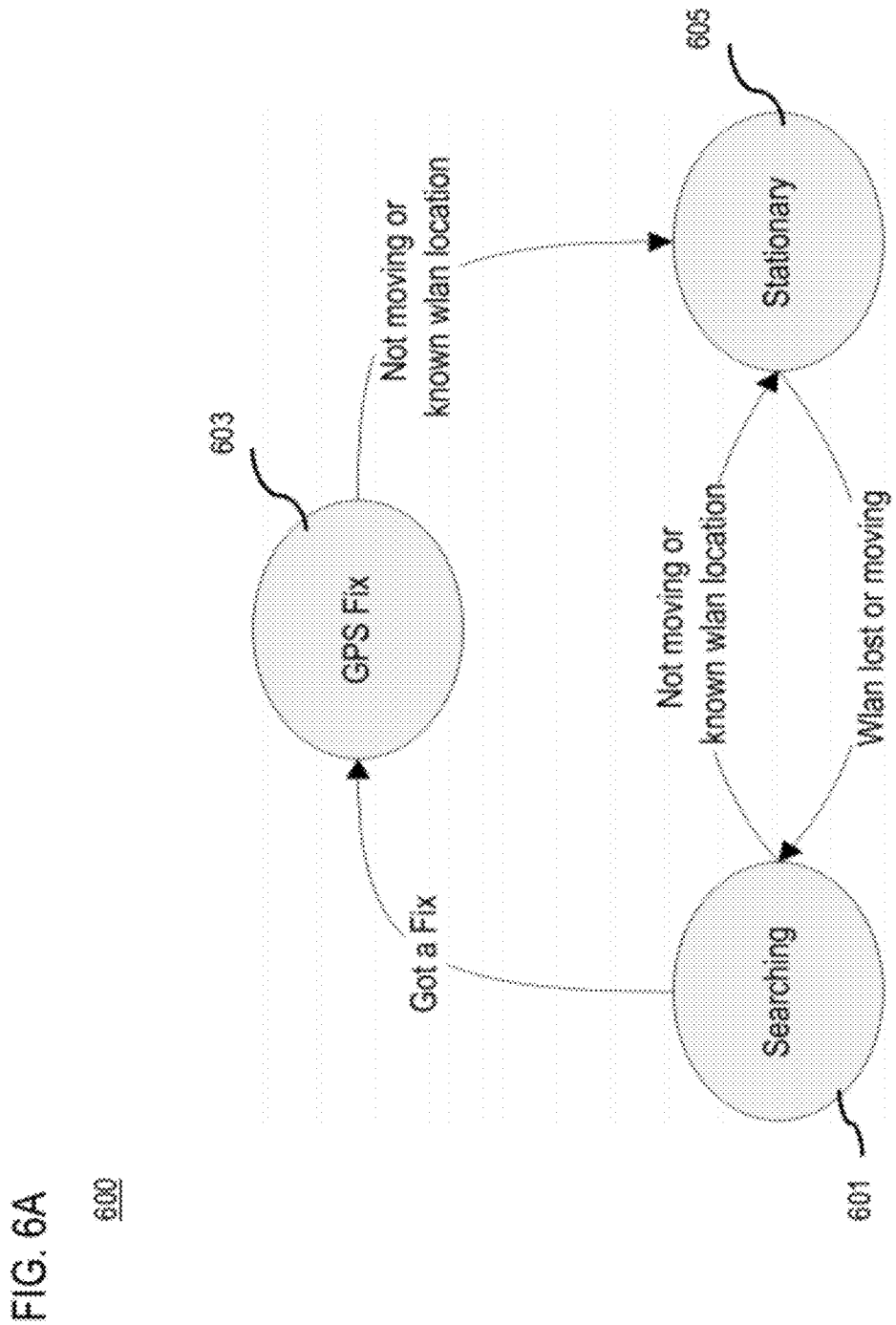
FIGS. 6A-6D show a state algorithm and its sub-algorithms, according to various embodiments.

FIGS. 6A-6D show a state algorithm 600 and its sub-algorithms 610, 630, 650 executed by the location point module 503 of a contextually relevant location platform 103a, according to various embodiments. The functions and operations of the location point module 503 of the contextually relevant location platform 103a are described in detail as follows. FIG. 6A shows a state algorithm 600, according to one embodiment. The state algorithm is based on three states: searching 601, GPS fix 603, and stationary 605. When the location point module 503 is in the searching state, it tries to find the current position of the UE 101. In one embodiment, the location point module 503 sequentially uses all the available positioning methods in order to optimize the speed and the energy consumption of the UE. The location point module 503 switches and stays in the GPS fix state as soon as the GPS gets a fix. A fix is a position solution calculated by a GPS receiver after acquiring satellite signals and navigation data. The location point module 503 leaves this state when the UE is perceived to be stationary. The transitions between the different states are asynchronous. For example, they can be triggered by external events such as the user beginning to walk, the UE being stationary, etc.

In one embodiment, the GPS data constitutes the core of the location point module 503. In another embodiment, additional location data sources, such as UE motion detection, WLAN recognition, user lifestyle, hardware adaption, etc. Are provided in order to optimize the UE's energy consumption. More raw location point data are obtained with additional location data sources in comparison with using only the GPS sensor. Such optimizations include, for instance: (1) known WLAN recognition is used to log and geo-locate frequently visited WLAN access points, (2) continuous motion detection data is used to recognize whether the UE is moving or not, (3) user profile data is used to adapt the parameters of the state algorithm based on the user's context and user lifestyle, and (4) manual or automatic hardware adaptation is used to adapt the location point module 503 to different hardware platforms (e.g., smart phones, mobile computers, internet tablets, etc.) with different consumptions and performance. For example, the hardware parameters can be automatically adjusted by the location point module 503. This can be done either by loading a predefined profile for that specific hardware or by making an auto-calibration. Moreover, if new positioning methods are available, the location point module 503 adapts the scanning sequence by including these methods.

Figure 6B:
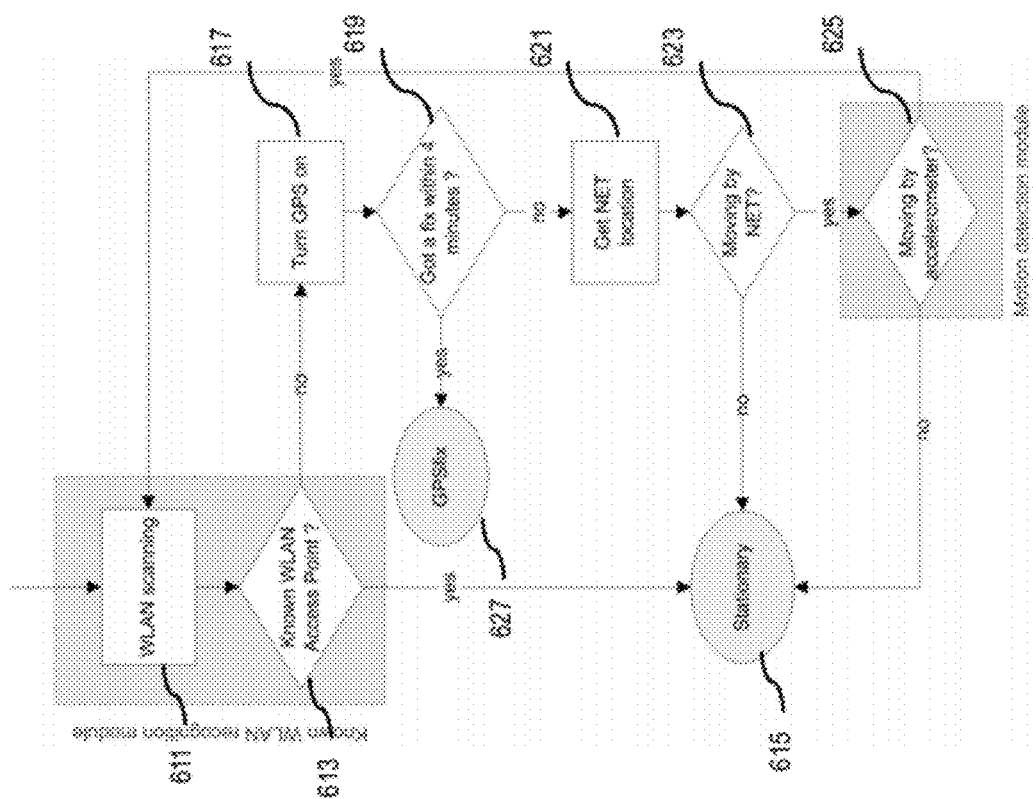

The transitions between states are described in detail with the support of pseudocode as follows. The location point module 503 starts with the searching state. This state is used to retrieve a position if there is none currently available. FIG. 6B shows a searching state algorithm 610, according to one embodiment.

As soon as a position of the UE 101 is retrieved, the UE state switches to another one depending on the source of the position gotten from. The searching for a position is done by sequentially querying the positioning methods available on the UE. The sequence is designed to optimize both the energy efficiency and the execution speed.

A first query is sent to a known WLAN recognition method (more details later), that scans for WLAN access points in the proximity of the UE per Step 611, and checks whether any of the WLAN access points is already present in the cached list of geo-located access points per Step 613. If so, than the position is retrieved from the local cache and the UE state switches to the stationary state (Step 615) with the reason for switching being WLAN.

If the known WLAN recognition method does not provide any positive results per step 613, an assisted-GPS (A-GPS) is activated (Step 617) and the A-GPS tries to get a fix for a MAX_GPS_SCAN_TIME, e.g., four minutes (Step 619). This timeout period should be long enough to guarantee that the A-GPS gets a fix (Step 627) in most situations where the GPS signal is available.

If the A-GPS is not able to get a fix, a network-based position method (NET) is used to obtain a rough estimation of the position per Step 621, and the UE is checked if stationary per Step 623. If so, than the UE state switches to the stationary state with the reason for switching being NET and the position being the one retrieved from the NET. The NET method has a high probability of retrieving a position as long as the UE has cellular network connectivity.

The last check is done with a motion detection method to find out whether the UE has been stationary per Step 625. If so, than the UE state switches to the stationary state with the reason for switching being the accelerometer and the position being, in the worst case, the one retrieved from the NET.

If the UE has not been stationary, the loop in FIG. 6B is restarted after waiting for a SEARCH_WAIT_TIME (e.g., one minute). The loop is repeated until either one of the following situations occur: (1) a position is retrieved with the known WLAN recognition method or the A-GPS, (2) if the UE is considered stationary by the motion detection method, and (3) if the UE has retrieved the same NET position for a MAX_NET_TIME (e.g., fifteen minutes).

There is a timer activated every MOT_TIMEOUT period that, if the reason for switching to the stationary state was WLAN, the Known WLAN recognition module is asked to double check whether the context has changed. In case the context has changed, and the UE is not stationary anymore, the UE state switches to the searching state. Otherwise, the timer is restarted.

Figure 6C:
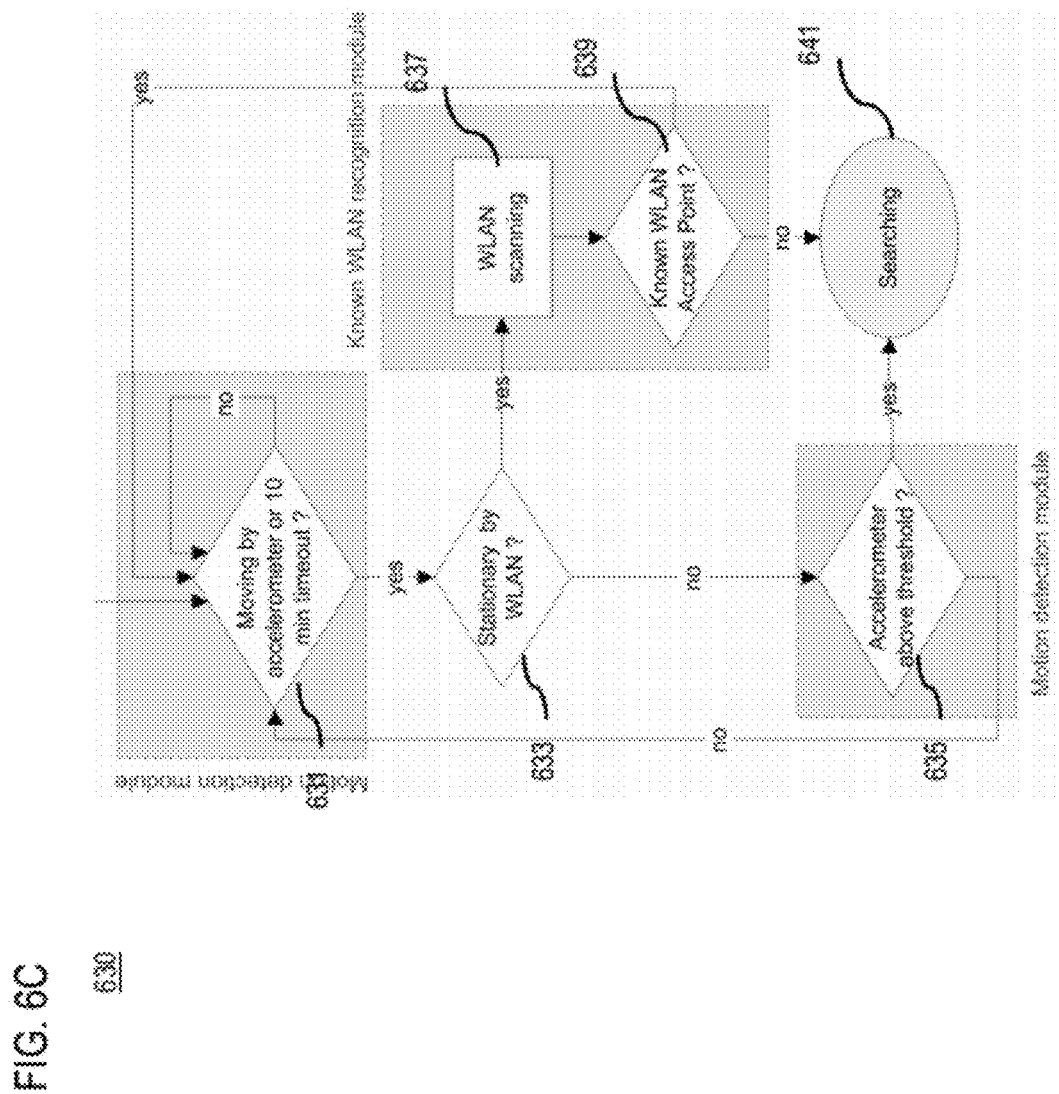

FIG. 6C shows a stationary state algorithm 630, according to one embodiment. The stationary state is designed to consume very low energy. In one embodiment, the active part of the UE is the motion detection module. Queries are sent to the motion detection module and a timer per Step 631, to check if the UE moves within a predetermined time period. The timer activated every MOT_TIMEOUT period (e.g., ten minutes). If the UE moves, the known WLAN method is used to check if the UE is in the stationary state per Step 633.

If the known WLAN method determines that the UE is not stationary per step 633, the motion detection module is checked again to see if the UE is stationary per Step 635. If the UE is again checked as stationary by the motion detection module, the process repeats the loop starting from Step 631.

If the known WLAN method determines that the UE is stationary per step 633, the state of the UE is switches into the searching mode by detecting a known WLAN access point per Step 637. If the known WLAN access point is found per Step 639, the process repeats the loop starting from Step 631. If no known WLAN access point is found per Step 639, the state of the UE is switched to the searching mode in Step 641. If the reason for switching to the stationary state was WLAN, a known WLAN recognition module is queried to double check whether the context has changed. In case the context has changed, and the UE is not stationary anymore, then the UE state switches to the searching state. Otherwise, the timer is restarted.

Figure 6D:
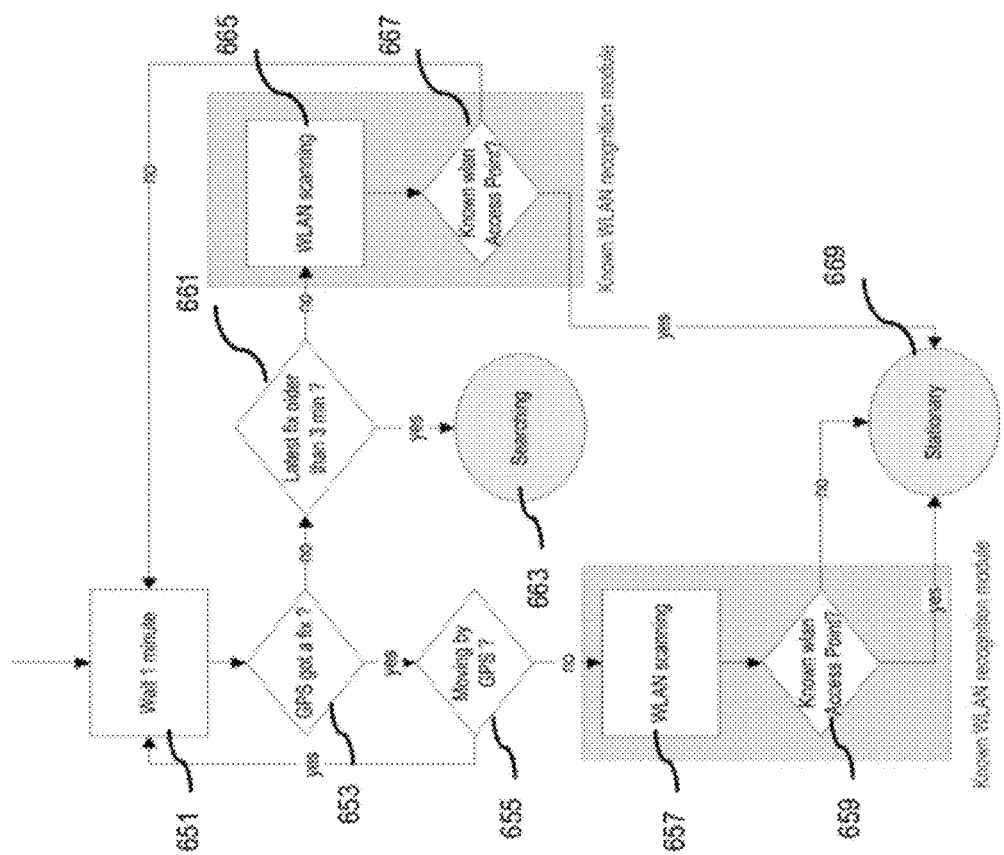

FIG. 6D shows a GPS fix state algorithm 650, according to one embodiment. The GPS fix is reached from the searching state whenever a position is available from the A-GPS. When entering this state, the location point module 503 waits for a GPS_FIX_WAIT_TIME, e.g., one minute (Step 651) while still trying to retrieve GPS points per Step 653 to avoid a situation that the fix is just temporary.

If the GPS still gets fixes (Step 653), then the location point module 503 monitors whether the UE stays in a GPS_MAX_RANGE (e.g., 50 meters) for at least GPS_MAX_TIME (e.g., four minutes) per Step 655. If the UE is not moving according to GPS (a typical example could be having lunch outdoors), the location point module 503 performs a WLAN scan (Step 657) and checks if the known WLAN recognition module detects a know access point (Step 659). If this is the case, the UE state switches to the stationary state with reason being "WLAN" per Step 659 Otherwise, the UE state switches to the stationary state with reason being "GPS" also per Step 659.

The UE state also switches to the stationary state in Step 667, when the GPS does not get a fix (Step 653) while the latest fix is younger than, for instance, three minutes or some other predetermined time (Step 661) and the known WLAN recognition module detects a know access point (Steps 665-667).

The UE state switches to the searching state in Step 653 by the A-GPS, when the GPS does not get a fix (Step 663) while the latest fix is older than three minutes or some other predetermined time (Step 661). In other words, if at any point, the GPS loses the fix for more than a LATEST_FIX_AGE (e.g., three minutes), the known WLAN recognition module is queried as to whether the UE senses any known access points nearby and therefore switching to the stationary state. In case of negative responses, the UE state switches to the searching state.

FIG. 7 shows a known WLAN recognition algorithm 700, according to one embodiment. Every time the known WLAN recognition algorithm 700 is invoked, the location point module 503 performs a WLAN scan per Step 701, and checks if the scanned access point is already in a local cache (Step 703). Each item in the list of available access points (if any) is processed. If the scanned access point is already in the local cache, the location point module 503 updates a count and a time of last seen of the access point per Step 705.

The location point module 503 then determines if the age of the scanned access point is older than a KW_LAST_GPS_FIX_AGE (e.g., ninety seconds) per Step 707. If the last position of the UE 101 is not older than the KW_LAST_GPS_FIX_AGE, the location point module 503 associates its latitude/longitude pair with the scanned access point (Step 709). If the scanned access point is already in the cache and it has a location associated therewith, the location point module 503 updates this location according to the following formula:

$$\begin{pmatrix} lat \\ long \end{pmatrix} = \frac{\begin{pmatrix} \text{old } lat \\ \text{old } long \end{pmatrix} \cdot nbr \text{ of locations} + \begin{pmatrix} \text{scanned } lat \\ \text{scanned } long \end{pmatrix}}{nbr \text{ of locations} + 1}$$

The location point module 503 also updates the counter associated with the access point (number of locations=number of time this access point has had a location associated with it; a count=number of minutes the access point has been seen). The location point module 503 determines whether the access point has been seen for at least MIN_KNOW_WLAN_TIME (e.g., fifty minutes) per Step 713. The location point module 503 categorizes the access point as a "known WLAN" if it has been seen for at least MIN_KNOW_WLAN_TIME (Step 715); otherwise as "not known WLAN" (Step 717).

If the scanned access point is not in the local cache of the visited access points (Step 703), its details (e.g., a service set identifier (SSID), media access control (MAC) address, signal strength, timestamp, etc.) are added to the cache per Step 711. Thereafter, the location point module 503 executes Steps 713, 715, and 717 as discussed before. Periodically or randomly, the location point module 503 clears the cache by removing the access points not seen during the last OLD_KNOWN_WLAN_TIMEOUT (e.g., fourteen days).

An alternative to geo-locating the W-LAN access points is associating the cell-IDs and received signal strength indicators (RSSIs) of multiple cells with GPS coordinates. Since the UE records cell-ids in any case, this alternative does not introduce extra burden onto the sensing activity, thereby increasing energy efficiency. After storing unique radio fingerprints, a known GPS route (e.g., home-office) can be followed by monitoring only the cells without activating GPS at all. The implementation challenge of this alternative is that the cell measurements are currently reported to the base station controller but not up from the cellular stack (except the special field test mode).

The motion detection executed by the location point module 503 is running in the background and sampling the data from the accelerometer for a SAMPLING_DURATION (e.g., 0.5 seconds) every DUTY_CYCLE (e.g., ten seconds). The accelerometer provides data for the three axes, namely x, y and z (on the UE which sampling frequency is around 30 Hz).

After each sampling period, the samples from the three axis are aggregated according to the following equation:

$$\begin{pmatrix} x_1 \\ y_1 \\ z_1 \end{pmatrix}, \begin{pmatrix} x_2 \\ y_2 \\ z_2 \end{pmatrix}, \begin{pmatrix} x_3 \\ y_3 \\ z_3 \end{pmatrix} \ldots \begin{pmatrix} x_n \\ y_n \\ z_n \end{pmatrix} \rightarrow \frac{1}{n} \sum_{i=1}^{n-1} \left\| \begin{pmatrix} x_{i+1} \\ y_{i+1} \\ z_{i+1} \end{pmatrix} - \begin{pmatrix} x_i \\ y_i \\ z_i \end{pmatrix} \right\| = \overline{E}$$

By way of example, the location point module 503 obtains a vector E' every 10 seconds. This process continuously runs in the background. Every time a new vector is generated, a sliding window takes the last SLIDING_WIN_DURATION (e.g., six) vectors E', and their values are averaged generating another vector E". Each component of the E" vector is compared to a MOT_DET_THRESHOLD value (e.g., five). If any of them is greater than the value, the motion of the UE is detected.

$$\overline{E} = \begin{pmatrix} \overline{x} \\ \overline{y} \\ \overline{z} \end{pmatrix}; \text{ if } (\overline{x} \text{ or } \overline{y} \text{ or } \overline{z} > \text{MOT\_DET\_THRESHOLD}) \text{ then motion detected}$$

If there is no motion of the UE detected, the location point module 503 continues the sampling process when a new vector E' is generated.

As an example, the power levels of each state have been measured with the percentage of time spent in each state, to evaluate the energy consumption of the location point module 503 based upon deterministic asynchronous finite state detection algorithm discussed in conjunction with FIG. 5. A weighted average power level is calculated by multiplying the power level of the state by the % of time spent in that state (see Table 1: Power levels for the state detection algorithm and its sub-algorithms).

TABLE 1

| State | Power Overhead | Total Power Level | % of time in each state |
|---|---|---|---|
| Searching | 283 mW | 353 mW | 3 |
| GPS fix | 349 mW | 419 mW | 6 |
| Stationary | 12 mW | 82 mW | 91 |
| Weighted average | 35 mW | 105 mW | — |

The average power consumption of the location point module 503 is 105 mW which outperforms the existing algorithms for continuous location tracking, such as EPFLscope® (only the location framework, 145 mW), and SenseLess® (118 mW).

Figure 8:
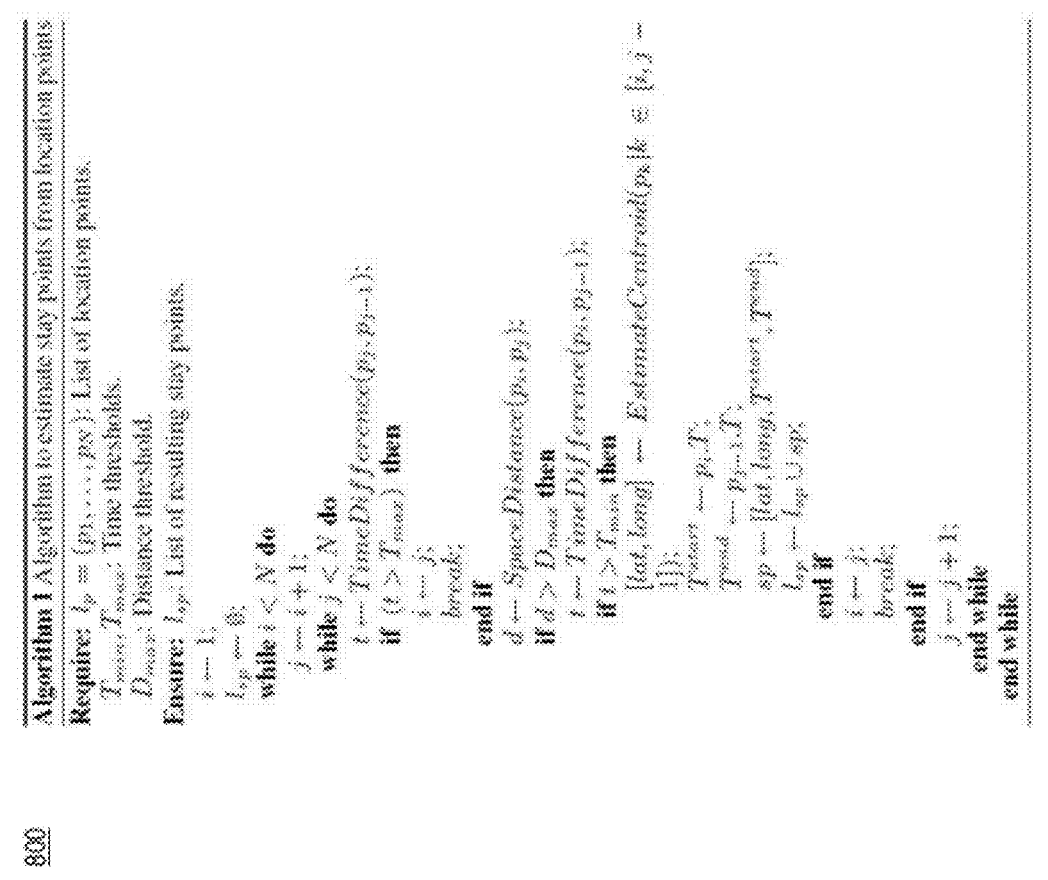
Figures 9A, 9B:
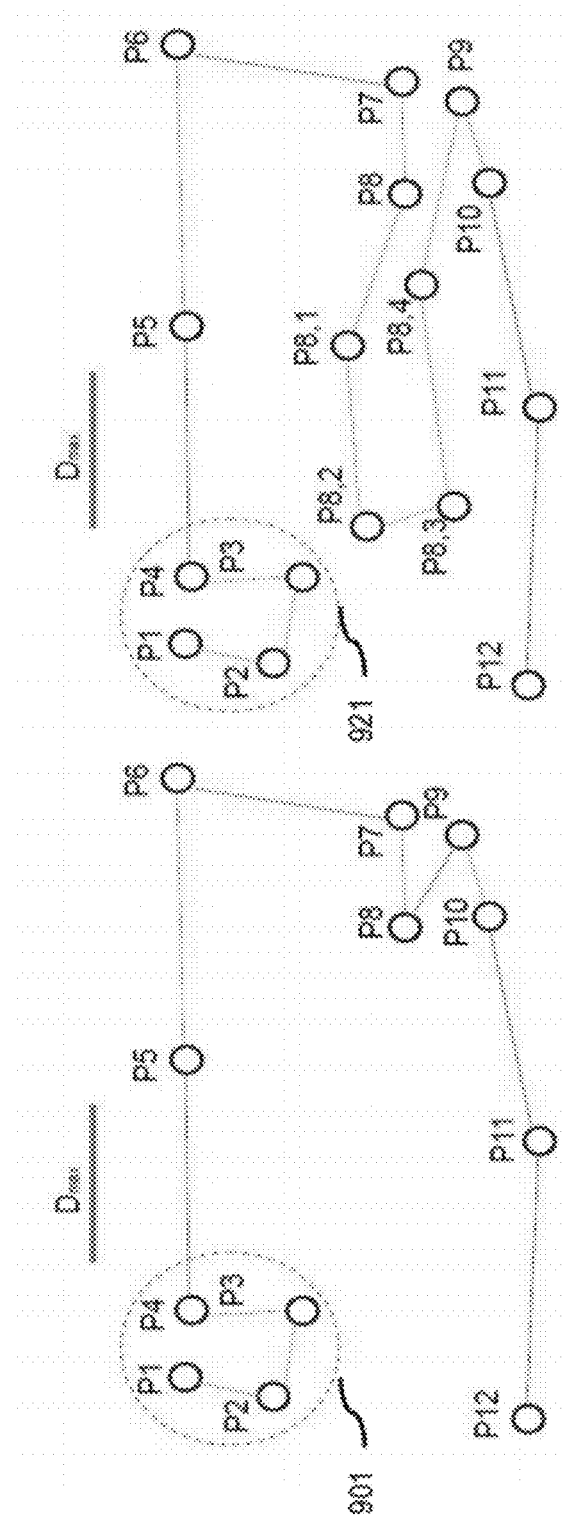
FIGS. 9A-9B show stay points discovered from location points, according to various embodiments.

The functions and operations of the location anchor module 505 of the contextually relevant location platform 103*a* are described in detail as follows. FIG. 8 shows an algorithm 800 for discovering stay points from location points, according to one embodiment. FIGS. 9A-9B show examples 900, 920 of stay points discovered from location points, according to various embodiments.

FIG. 9A illustrates advantages of the algorithm of FIG. 8 using a sequence of location points in a latitude-longitude coordinate space. Each pair of consecutive location points are connected with lines. The line is green when the time difference between the two connected location points is less than Tmax and otherwise in red. In FIGS. 9A-9B, a stay point 901/921 (circled with a broken line) is detected by grouping location points p1, p2, p3 and p4, since the time difference between location points p1 and p4 is larger than Tmin and the geographic distance between p1 and p4 is less than Dmax.

On the other hand, although the time difference between location points p7 and p10 is larger than Tmin and their geographic distance is less than Dmax in FIG. 9A, the location anchor module 505 does not define the set of location points p7, p8, p9 and p10 as a stay point, since the time difference between location points p8 and p9 is bigger than Tmax (e.g., the maximum time allowed between two consecutive location points).

The real-life data often has a substantial time difference between two consecutive location points, due to the GSP sensor's inability to accurately sense location points in many real-life places. For example, the user visited many location points p8,1 to p8,4 between location points p8 and p9 in FIG. 9B. However, these location points p8,1 to p8,4 could not be captured by the GPS sensor. Without applying the third constraint Tmax, an incorrect stay point would have been detected between location points p7 and p10. As shown, Tmax correctly handles a situation when the inevitable lack of location data and avoids creating incorrect stay points.

Thereafter, the location anchor module 505 executes an algorithm for estimating location anchors for each day for the user. FIG. 10 shows an algorithm 1000 for estimating location anchors for a user, according to one embodiment. The algorithm starts with clustering all the stay points discovered for the user. It assumes that the progress works with data of Q days, and thus there are Q different lists of stay points (one per each day). The function Clustering(,..) denotes a particular clustering algorithm, such as density-based clustering, grid-based or boundary-based clustering, etc. The grid-based or boundary-based technique obtains better results than the density-based technique, since the density-based technique tends to merge stay points with different semantic meaning in the same clusters. Although, various embodiments are discussed with respect to a grid-based technique, it is contemplated that the various embodiments are applicable to any boundary-based technique (e.g., boundaries established using shapes of varying sizes and/or shapes, and shapes other than regular squares or rectangles).

The grid-based technique explicitly constrains the cluster size. The parameters of the algorithm include the maximum size allowed for a cluster. The previously defined parameter Dmax is used for this purpose. Dmax is the maximum distance that a user can cover in a place to be considered as a stay point and also is the maximum size of a stay region. Big values of Dmax merge several places in only one, while small values of Dmax divide a place. The proper Dmax value is in the range of 200 to 300 meters depending on the application.

Tmin is the minimum time that the user must stay in the same place to be considered as a stay point. High Tmin values discover places (e.g., home, work, etc.) where the user stayed for a long time, while small Tmin values discover places (e.g., a bus stop, train station, etc.) where the user stayed for a few minutes. The proper Tmin value is in the range of 20 to 40 minutes depending on the application.

Tmax is the time difference between two consecutive location points. High Tmax values discover more places, yet including more false places. This could be useful in some applications when discovering a lot of places of interest is intended. On the other hand, by setting Tmax to a low value, only the most significant place for the user will be discovered, which is useful to applications intended to discover and utilize the most meaningful place for the user. The optimum value for Tmax also depends on the application.

Using real-life data of one volunteer user collected over five months of continuous location extraction, the algorithm of FIG. 10 extracts most of the relevant places in users' real life, when the three parameters are set as Dmax=250 meters, Tmin 30 mins, and Tmax=10 mins.

As discussed in FIG. 6A, the location anchor module 505 clusters the stay points continuously and in real time (e.g. As soon as they are collected). Every time a new point is generated, it is clustered with the existing ones in real time. In another embodiment, the location anchor module 505 clusters the stay points in batch mode (for example, the clustering can be done every day, or every week). Every time (e.g., a day) there is a clustering process, all the stay points (old and new ones) are involved in the clustering process. By way of example, the location anchor module 505 processes data from day 1 on day 1; processes data from day1+day2 on day 2, ; . . . ; processes data from day 1+day 2+ . . . +day n on day n.

Figure 11A:
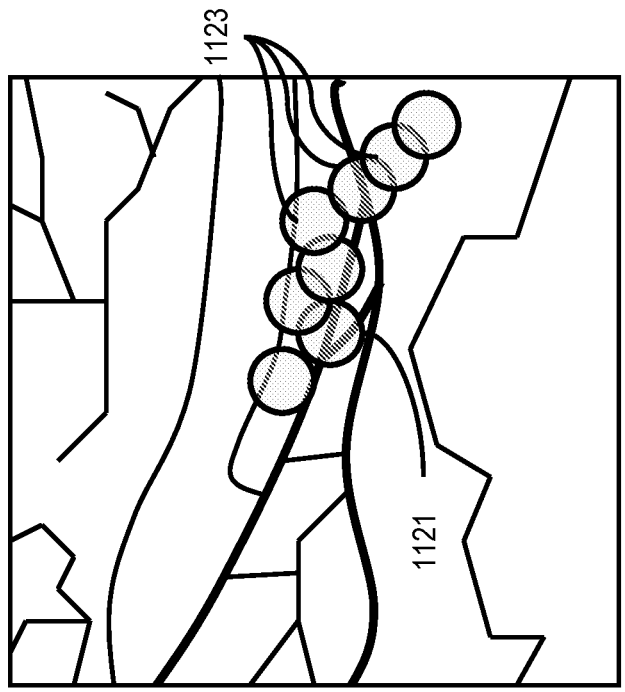
FIGS. 11A-11B show location anchors of different shapes and sizes, according to various embodiments.
Figure 11B:
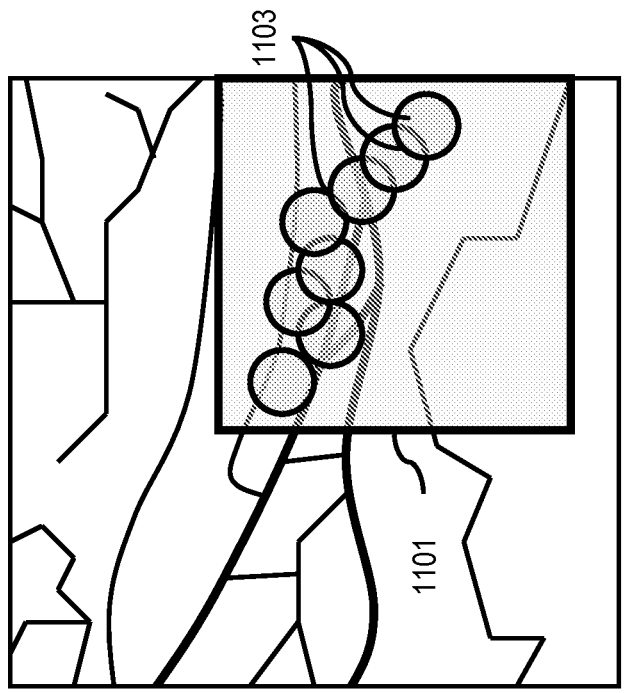

FIGS. 11A-11B show location anchors of different shapes and sizes, according to various embodiments. As discussed, the location anchor module 505 generates (e.g., from stay points 1103) location anchors that have a predefined shape, e.g., a rectangular location anchor 1101 in the map 1100 of FIG. 11A. Referring back to FIG. 3C, location anchors have different sizes.

In another embodiment, the location anchor module 505 generates a location anchor with an arbitrary shape 1121, e.g., defined by overlapping eight stay points 1123 in the map 1120 of FIG. 11B, thereby improving its precision. In this embodiment, at least a portion of at least two location anchors at least partially overlap, and the boundary of the location anchor is of varying size, varying shape, or a combination thereof.

Figure 12B:
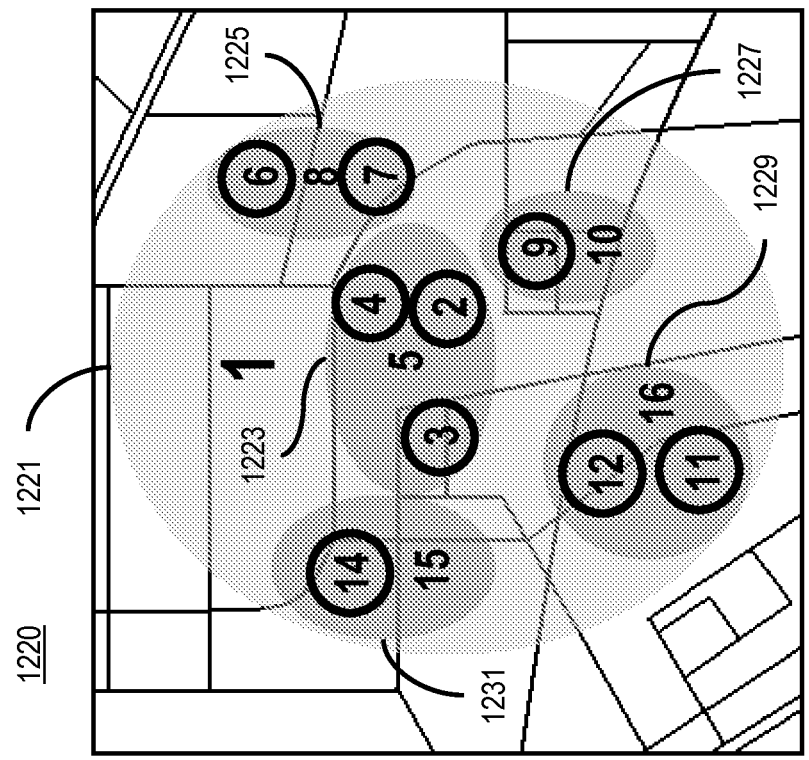
FIGS. 12A-12C shows non-hierarchical and hierarchical location anchors, according to various embodiments.
Figure 12A:
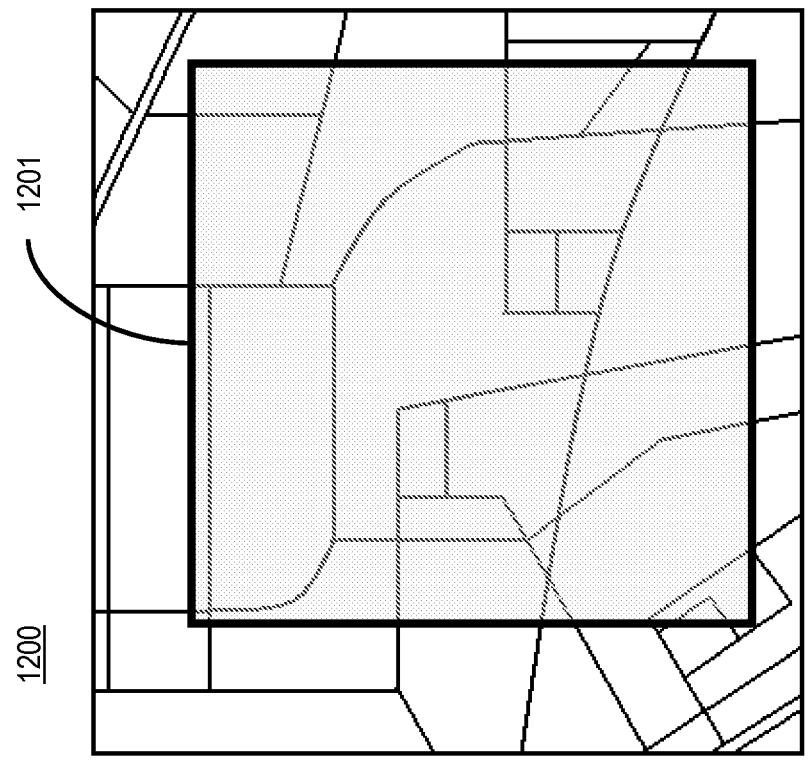
Figure 12C:
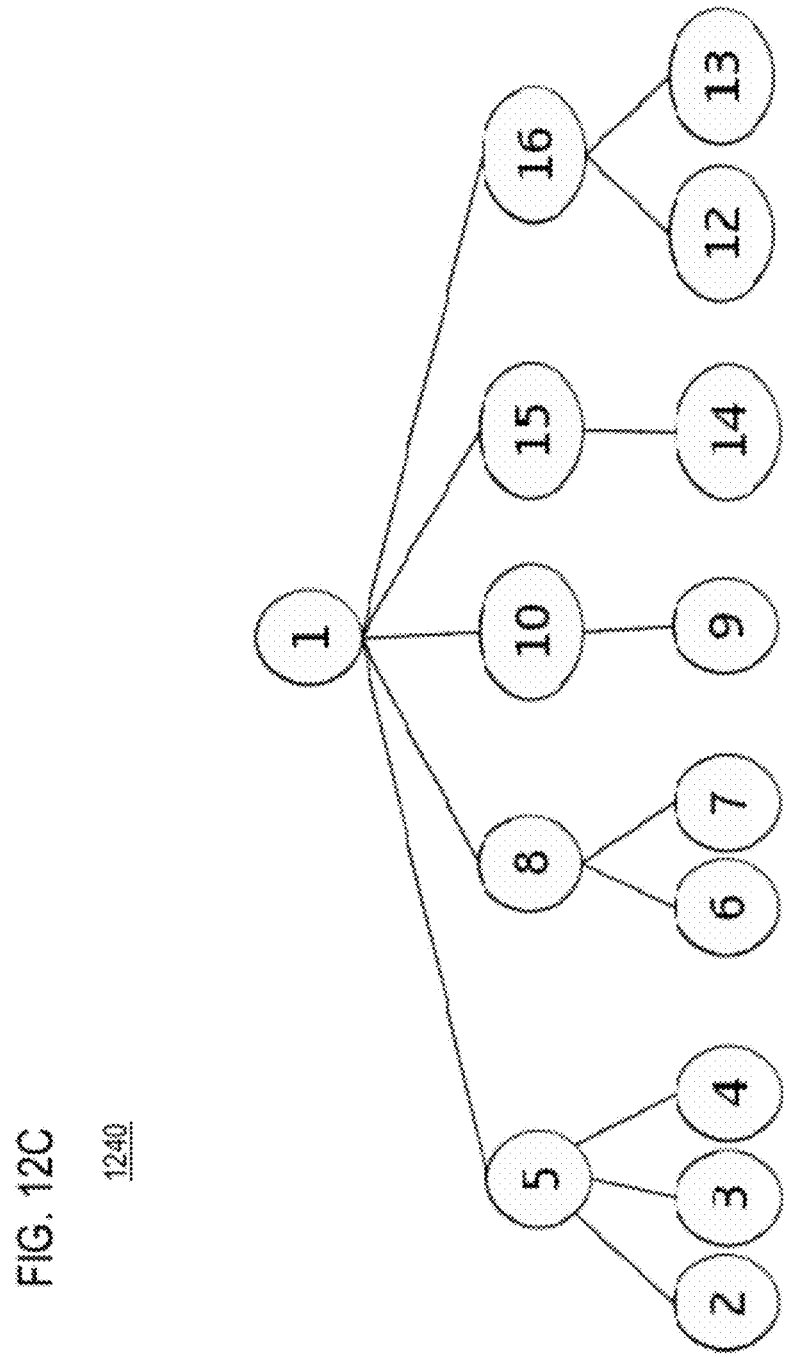

FIGS. 12A-12C shows non-hierarchical and hierarchical location anchors, according to various embodiments. As shown in FIG. 3C, the location anchor module 505 generates a plurality of non-hierarchical location anchors. In a map 1200 of FIG. 12A only one location anchor 1201 in rectangular is generated per each cluster of stay points and its size grows as more stay points are added. In another embodiment, the location anchor module 505 generates hierarchical location anchors (LAs) 1-15 as shown in a map 1220 of FIG. 12B. By way of example, when more than one stay point are clustered in a location anchor (e.g., LA 14) that has reached its maximum size, another location anchor (e.g., LA 15) is generated, and the two location anchors are grouped together as LA 1211 while keeping their original information. By analogy, LAs 1221, 1223, 1225, 1227, 1229, and 1231 are formed by grouping the respective LAs 1-13. The whole LA hierarchical structure of FIG. 12B is represented as a three-tier tree 1240 in FIG. 12C. By way of example, when a student studies at a university campus, by using the non-hierarchical approach, the campus becomes a big location anchor after some months, without differentiating single buildings anymore. By using the hierarchical approach, the campus can appear like a big location anchor 1221 (corresponding to label "1") as well as sub-location anchors 1223-1231 (including labels "2"–"15"), such that the student can browse into sub location anchors.

Therefore, the determining of the location-based data, the plurality of stationary points, the context data, the at least one location anchor, or a combination thereof is performed continuously, substantially continuously, periodically, according to a schedule, or a combination thereof.

The following discussion focuses on implementing the place-of-interest learning technique at the user interface level. When the system 100 discovers a new place, the system 100 asks the user about labeling the place in order to add semantic meaning to the discovered places. Each use case described below is associated with applying location anchors. In addition, when the user approaches or arrives at a cached location anchor, the UE 101 asks the user whether he/she is really in this place, thereby improving and simplifying the procedure of evaluating location anchors.

Figure 13B:
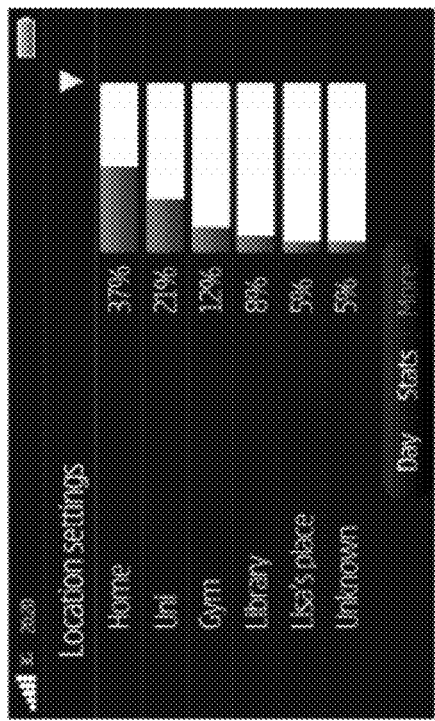
FIGS. 13A-13D are diagrams of user interfaces displaying location anchors, according to various embodiments.
Figure 13D:
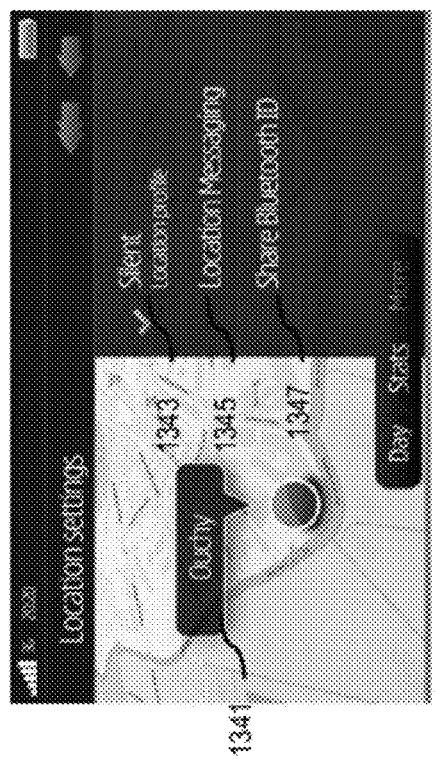
Figure 13A:
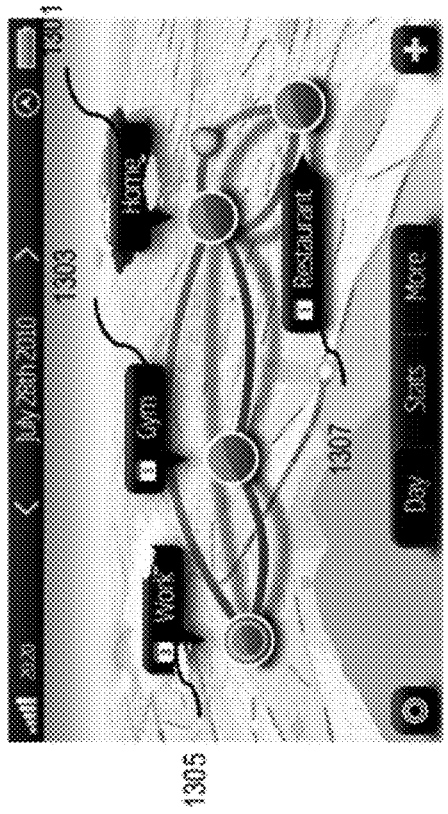
Figure 13C:
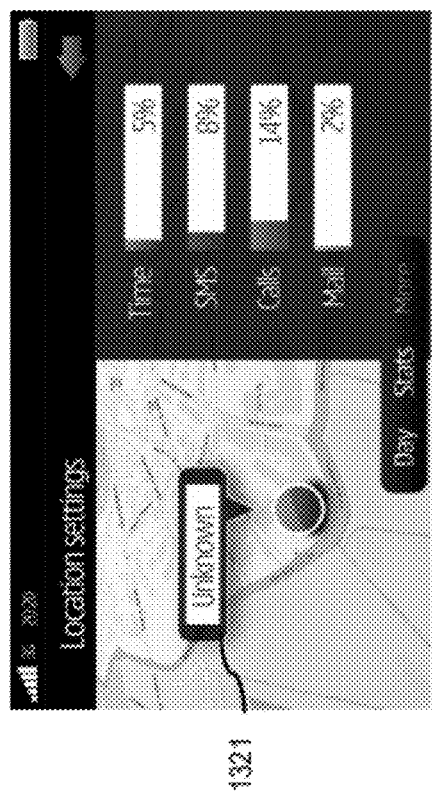

FIGS. 13A-13D are diagrams of user interfaces displaying location anchors, according to various embodiments. Once a location has been recognized as a location anchor (e.g., home 1301, gym 1303, work 1305, and restaurant 1307) for a given user, the user could access it through a "location panel" displaying locations that are relevant to the user as shown in FIG. 13A. Location anchors identified for the user are shown in the location panel in FIG. 13B, and sorted in an ascending order based on time spent in a respective location anchor. For example, the user spends 37% of the time at home, 12% of the time in the gym, etc. Location anchors are named in the panel to facilitate subsequent recognition of the location anchors in various applications. In one embodiment, a location anchor is named automatically by the system 100 (e.g. "home" is relatively easy to recognize based upon internal or external data). By way of example, naming is done on basis of a calendar event location field in the calendar stored in the UE. In another embodiment, naming is done through user inputs. FIG. 13C shows an unknown location anchor pop-up 1321 in a map in conjunction with relevant associated information including time the user spent there, percentages of user SMS, calls, emails associated with the location, etc. The system 100 can cue the user to name the location based upon the displayed information, to simplify the naming process.

Since the UE 101 is carried by the user everywhere, the location anchors are likely to represent a reliable summary of the places that are relevant to the user (as opposed to manual creation of locations, such as in Foursquare®, which is likely to capture only a subset of locations relevant to the user).

In another embodiment, the functionality and/or device profile of the UE 101 are personalized for a given location anchor. For instance, in FIG. 13D, the user associates a profile (e.g. Silent 1343, location massaging 1345, share Bluetooth ID 1347, etc.) to the UE 101 whenever the UE 101 is located in the particular location anchor (e.g., Ouchy 1341). The user can also set up certain location messaging functionality, based upon one or more rules, such as "whenever the UE exits a location anchor, notifying my wife". Customization of the UE profile using location anchors is more reliable than using geo-coordinates or a cell tower. The location anchors are highly reliable in determining whether or not someone is in a certain location. The shape of the location anchor can also be determined in a more accurate and relevant way as compared to e.g., using cell tower information, to detect that someone is in a certain location.

Figure 14A:
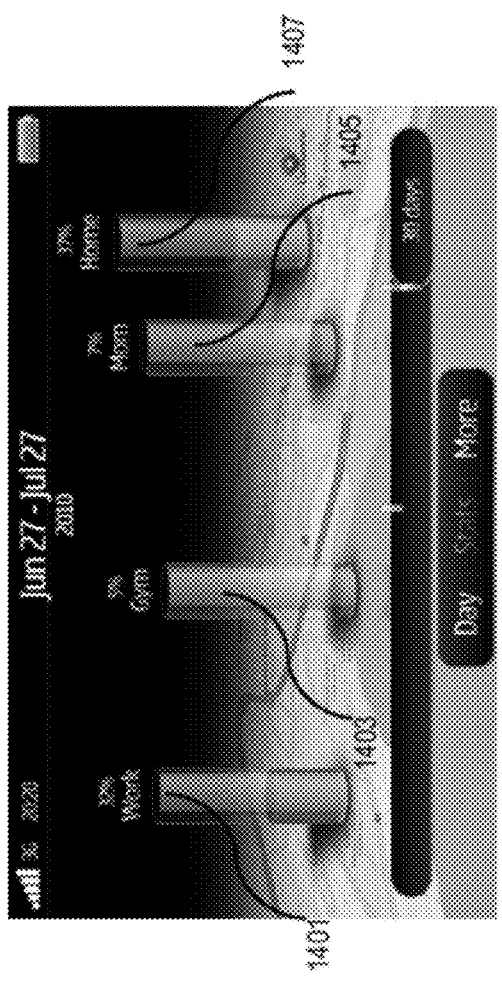
FIGS. 14A-14B are diagrams of user interfaces visualizing location anchor based statistics, according to various embodiments.
Figure 14B:
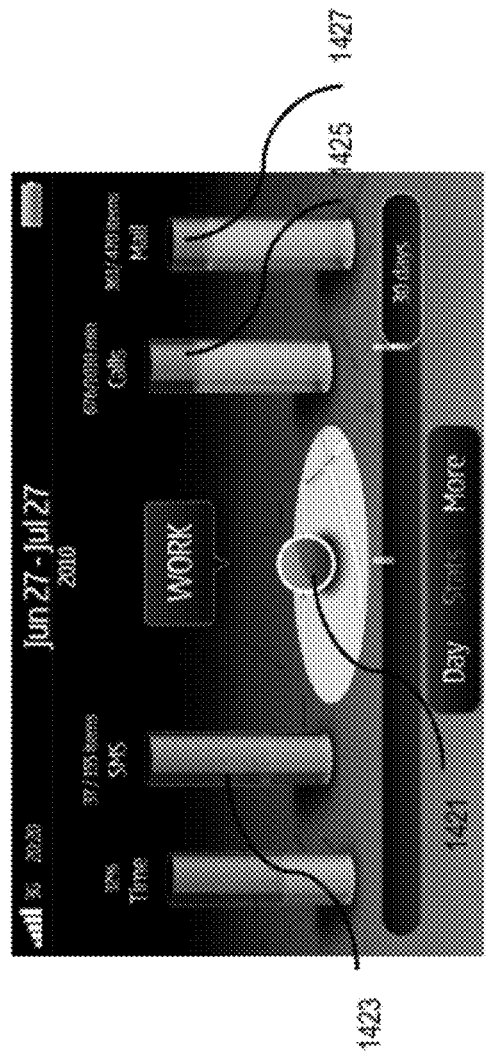

FIGS. 14A-14B are diagrams of user interfaces visualizing places based statistics, according to various embodiments. Several different types of statistics can be shown to the user pertaining to user behavior across the location anchors. For instance, time spent in any given location, applications used, people encountered, etc., can be shown to the user. FIG. 14A shows percentages of time in 30 days from June 27 to Jul. 27, 2010 that the user spent in various location anchors (e.g., work 1401: 32%, gym 1403: 5%, mom 1405: 7%, home 1407: 37%, etc.).

FIG. 14B shows in the location anchor titled 'Work', the UE usage percentages for various communication functions, such as SMS 1423 (37/155 items), Calls 1425 (676/1010 minutes), and Mail 1427 (361/470 items). Location anchor mechanisms enable accurate detection of the user located in a given area, thereby capturing behavior (e.g. Phone use) occurring in that particular location at an equally reliable level.

Statistical figures so obtained are more reliable compared to, e.g., Gowalla®, that requires the user to manually check in to the given location (this does not always happen, resulting in loss of data). The above-described embodiments automatically identify location anchors, thereby represent the user with the statistical figures holistically across all relevant locations.

FIGS. 15A-15G are diagrams of user interfaces overlaying calendar information on top of one or more location anchors in a map, according to various embodiments. The system 100 examines chronological overlaps between calendar events and location anchors pertaining to a given user, and organizes the calendar events across one or more location anchors over a predetermined period of time (e.g., one or more hours, days, weeks, months, seasons, years, etc.). Overlaying calendar events spatially over location anchors according to the likelihood of occurring thereat provides an overview for the user to organize daily life.

In one embodiment, the system 101 associates a set of location anchors (e.g., home, football field, etc.) with time slots for each day and time of day, based on probability distributions assigned for each of the location anchors. For examples, location anchor "home" is likely to be visited during every day of the week, and location anchor "football field" is likely to be visited only on two days, e.g., Tuesday and Friday. For Tuesday, the user has a high probability of being at home between 9 PM and 9 AM, a medium probability between 3 PM and 9 PM, and a low probability between 9 AM and 3 PM. In one embodiment, the following rules are applied to assign location anchors to time slots. (1) A commute label is assigned to certain hours of day, if it is conceivable that the user is most like commuting rather than staying at a fixed location anchor. (2) When two or more location anchors might have a similar likelihood of being assigned to one time slot, assigning the location anchor to the time slot depending on the application of this information. (3) Considering, for instance, seasonal variation, which would lead to, e.g., summer cottage only being relevant in the summer time, or grandparents' place only being relevant during festivals, such as Christmas. Location anchors could therefore be categorized to two classes: weekly and less frequently occurring ones, in order to account for such variability. In another embodiment, the time slot assignment is conducted by using user context information such as the user's calendar, emails, calls, SMS, blogs, etc.

In one embodiment, the event on the foreground determines the location anchor that is visualized on the background. FIG. 15A shows a drill-down view of a calendar 1501 with five events on Jul. 28, 2010. When an event 1503 (e.g., 17:30-19:30 Fitness class-Gym) is highlighted, the associated location anchor 1505 (e.g., gym) is shown on the map in conjunction with the event information 1507 (e.g., time, location, content, address, website associated with the event) on the user interface.

Figure 15B:
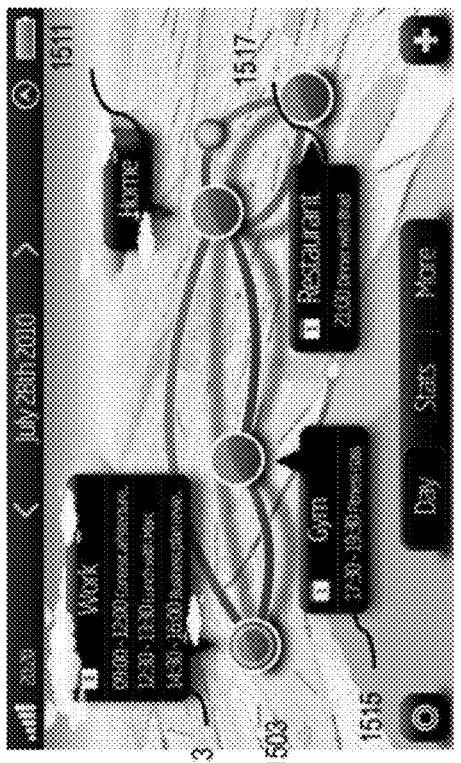
Figure 15A:
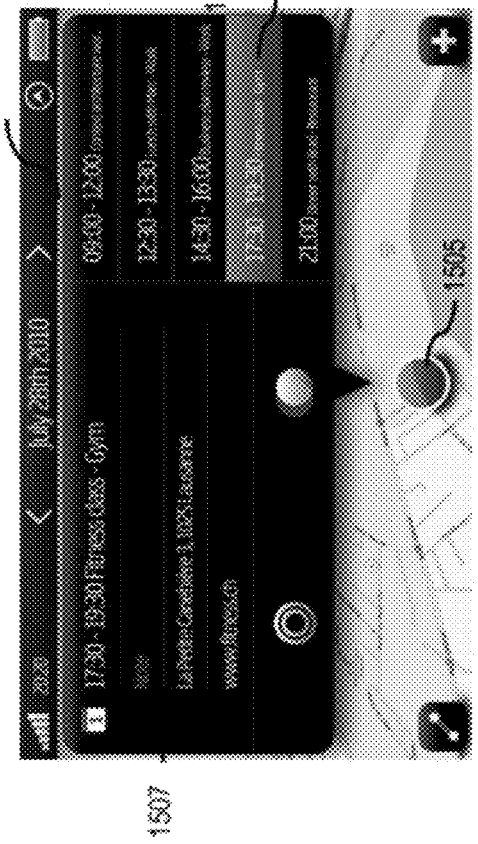

In another embodiment, all location anchors (e.g., home, work, gym, restaurant, etc.) pertaining to the user for a predetermined period of time (e.g., Jul. 28, 2010) are shown in the map with individual calendars of the location anchor in FIG. 15B. By way of example, three events are scheduled at work 1513, while one event is scheduled at the gum 1515 and the restaurant 1517 respectively. In this visualization, the order of the calendar events is apparent by showing the time slot associated with each event. FIG. 15B shows a number of events scheduled at one location anchor with a numerical label (e.g., 3) in the event pop-up for a location anchor (e.g., "work"). Optionally, a first color (e.g., blue) indicates places (e.g., home, work, and gym) where the user has been to in the course of the day, and a second color (e.g., red) indicates a location/event (e.g., restaurant) yet to visit/happen later (e.g., at 21:00) during the day (e.g., now is 20:20) in FIG. 15B.

Figure 15C:
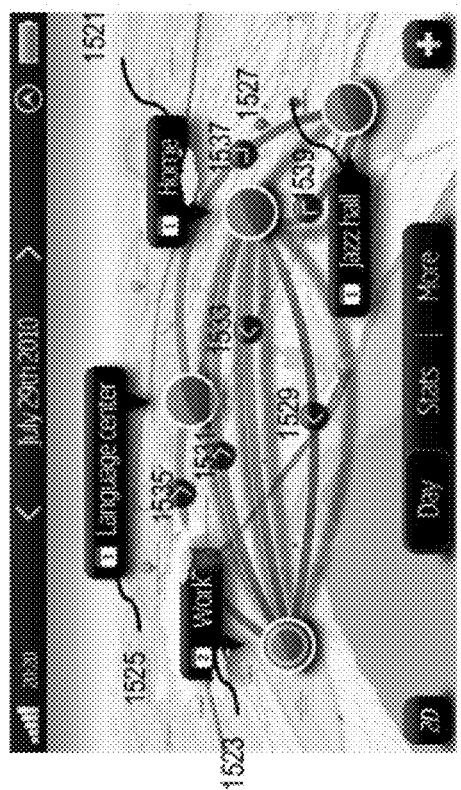

In another embodiment, arrows are shown in the user interface to convey a chronological order of events associated with one or more location anchors for a predetermined period of time. FIG. 15C shows arrows between the location anchors conveying the order of calendar events for the user on Jul. 29, 2010. By way of example, the user wakes up at home 1521 and commutes to work 1523 as indicated by an arrow 1529. The user then goes back home for lunch as indicated by an arrow 1531 and returns to work as indicated by an arrow 1533. Later, the user goes to the language center 1525 as indicated by an arrow 1535, visits the jazz hall 1527 as indicated by an arrow 1537, and then returns to home as indicated by an arrow 1539.

In yet another embodiment, animation is applied to convey the chronological order of the events associated with location anchors. FIGS. 15D-15G depict an animation or sequence of user interfaces that convey the order of the user's projected movements. By way of example, FIG. 15D shows the user arrives at the train station 1541 by train as indicated by an arrow 1543. FIG. 15E shows the user goes to the ETH university 1545 for a meeting (10:30-12:30) as indicated by an arrow 1547. FIG. 15F shows the user meets someone at a restaurant 1549 for lunch (12:30-13:30) as indicated by an arrow 1551. FIG. 15G shows the user goes back to the train station as indicated by an arrow 1553, and then back to a starting point as indicated by an arrow 1555.

Figure 16:
FIG. 16 is a diagram of a user interface for organizing personal content as a function of one or more location anchors, according to one embodiment.

FIG. 16 is a diagram of a user interface organizing personal content on a user device as a function of one or more location anchors, according to one embodiment. In one embodiment, media content items (e.g., notes, emails, calls, voice messages, photos, audio and/or video clips, etc.) are filtered as a function of at least one location anchor (e.g., work). By way of example, if a media item is deemed to be generated around the location anchor, this location anchor is recorded as metadata pertaining to that file of the media item. As another example, the user interface shows all pictures taken in a particular location anchor during the time of a calendar event, and optionally, in conjunction with communication occurring during the event.

In FIG. 16, photos 1601, mails 1603, calls 1605, SMS 1607 were taken during a team meeting calendared during 15:30-16:30 at work, thus the location anchor "work" is associated with these media content item as metadata. The media content items may be generated with the UE 101 or downloaded from one or more external sources (e.g., another UE, database, website, etc. Participating and/or associated with the team meeting). As another example, the UE 101 has a feature in its image gallery to organize photos as a function of a cell ID of entities with customized names. This embodiment organizes content according to location anchors with high yields.

In another embodiment, the system 100 supports location based advertising. Location anchors can be used to customize and/or deliver location based advertisements. In one embodiment, the system 100 allows the user to choose which location anchors associated with receiving advertisements. For example, the user chooses to receive supermarket sales information based upon the home location anchor. The system 100 uses location anchors to tailor the logic in which the advertisements are delivered. By way of example, the system 100 sends an advertisement (e.g. "come to Domino's pizza and receive a twenty percent discount on all pizzas") to the user when the user is close to a restaurant location anchor. The system 100 may bill the advertising merchants after delivering the advertisement and/or after the user have viewed and/or followed the advertisement and visited that restaurant. In yet another embodiment, the system 100 enables the user to block advertisements associated with a certain location anchor.

In another embodiment, the system 100 facilitates context sensitive surveys, such as tracking wellness related user behaviors. In one embodiment, the system 100 associates a given location anchor with designing a survey, as well as sending the survey, for example, when the user exits that location anchor. The system 100 delivers the survey when the user exits the location anchor and still has fresh memory of the behavior when answering questions. The survey (e.g., asking how much the user exercised at the gym) thus yields a high level of reliability.

In another embodiment, the system 100 feeds the location anchor information to social networking services. In one embodiment, when the UE 101 uploads location anchor information to a service provider (e.g., Nokia®), the service provider opens up the location anchor APIs toward third party service providers such as Facebook® or LinkedIn®. In this way, the user's location anchor status is reflected in a real-time fashion on the user's Facebook® profile to be visible to the user designated friends. Since the user is provided with the chance of naming the personal location anchors, the locations make sense to members of the social network of the user. Therefore, the location anchor information adds a semantic dimension to location data stemming from the UE.

In another embodiment, the system 100 facilitates location anchor based power recharging and supply restocking (e.g., food, office supplies, etc.). Taking UE battery power as an example, increasing device complexity and more frequent use of Internet and other functions increase user device battery power consumption. The system 100 associates location anchors with public/private UE charging opportunities, and prompts the user to charge the UE 101 when approaching or arriving at a location anchor associated with a public/private charging point. The system 100 determines the current charge status of the battery, the contextual power loading in different locations, the charging facilities the user usually use, and then maps the user's location anchors to private and public charging facilities.

In one embodiment, the system 100 prompts the user to charge the UE 101 based upon the following rules. If a forecast usage pattern uses>x % of an existing charge before reaching the next anchor point charging location, the system 100 recommends charging at the existing anchor charging point. If the actual charge is <y %, the system 100 enters an emergency mode and displays details a nearest public charging location. If a forecast usage pattern between now and next n anchor charging point locations will result in <z % of the charge remaining by an anchor charging point location n, the system 100 calculates an optimum charging pattern to minimize the number of recharges while retaining a high probability of UE availability between the current anchor point charging location and anchor point charging location, n. If the charge is not complete at a current location anchor, the system 100 plans a longer charge at the next location anchor in the forecast.

In another embodiment, the system 100 provides the user tips on how to improve charging patterns (based on, e.g., recording contexts where the user has failed to charge the battery full). When the power is low, the user can choose from the map the next possible location anchor to charge the battery.

In another embodiment, the system 100 saves power by directing the user to charge the UE 101 at locations in close proximity to a base station, thereby reducing the transmit power of the phone while maintaining full functionality. In another embodiment, the system 100 identifies potential power sources to plug in an AC adapter by using a charging point detector (e.g., MEMS based sensors for detecting the EMF radiated from cabling to power outlets), and guides the user to possible power outlets at the location anchors. The system 100 then records these power outlets at the location anchors as anchor point charging locations in a charging point mapping table or database. The system 100 further optimizes the charge for user convenience and priorities, such as "on time," etc. The system 100 may adapt a charge rate based upon a location anchor p and planned forecast usage.

In another embodiment, calendar event information scattered across location anchors is taken into account to anticipate busy patches in the user's life. When there are calendar events obstructing the user, the system 100 makes the recommendation earlier, in between meetings, or otherwise in suitable contexts. By varying its parameters and the nature of recharging provided, the system 100 is adapted for use with a wide range of energy storage devices (e.g., lithium-ion cells, fuel cells, wired and wireless charging means, etc.). By analogy, the above-discussed charging embodiments can be applied to fill up gas tank at gasoline location anchors, to restock grocery at market location anchors, etc.

The above-discussed embodiments discover location anchors from user device data. UEs have been used as sensors to obtain location information from users' real lives. The above-discussed embodiments extract location points (e.g., for each day of a user) based upon location points, estimate stay points using the extracted location points, then use the stay points to discover location anchors, thereby applying the stay regions in different applications.

To obtain richer user location points, a client program has been installed in the UEs, which is able to obtain location information by using GPS, WiFi, GSM and accelerometer sensors. The process as discussed obtains location data for approximately 63% in real life (e.g., not in scripted experiments or artificially encourage mobility). Location data are first applied with a time-based method which allows discovering the stay points by using a constraint Tmax that avoids large time periods between two consecutive location points. Then, the stay points are clustered into stay regions (places of interest) using a grid-based clustering technique.

The performed experiments demonstrated that the above-discussed embodiments obtain more location points corresponding to actual life of people than using only the GPS sensor. The above-discussed embodiments do not access a beacon location database. In addition, the above-discussed embodiments obtain better results in discovering the most significant places of interest for the user, comparing existing techniques using the same input location points.

Although various embodiments are described as above with respect to an specific application for rendering location anchors and relevant information, it is contemplated that the approach described herein may be used with multi-dimensional context data, such as entertainment, travel, health, sports, personal finance, career, relationships and hobbies, etc.

The multidimensional model is computed by utilizing data items/entities from various sources, such as the web service platform 103*b*, the communication platform 103*n*, etc. Each piece of data is mapped as coordinates into the multidimensional model and is considered as a contextual item or entity. A contextual entity can be anything that can be expressed as coordinates, such as media content items, emails, etc. The coordinates may be mathematic coordinates, geographic coordinates, etc. By way of example, the system 100 applies a latitude-longitude coordinate system or a Cartesian coordinate system. The coordinates do not have to be physical or conceptual coordinates.

As mentioned, a considerable amount of user activities are performed in offline-mode. To ease user interaction with the system by providing location anchors while under the constrains of data storage and computing power, the system 100 further simplifies representation of the location anchors by maintaining only the most prominent ones at an on-demand basis. For example, if the user travels to a new city, the system 100 extracts location anchors for that particular city to be downloaded into the UE 101 when the user is online for the first time from that city.

The processes described herein for determining and utilizing geographical locations contextually relevant to a user may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 17:
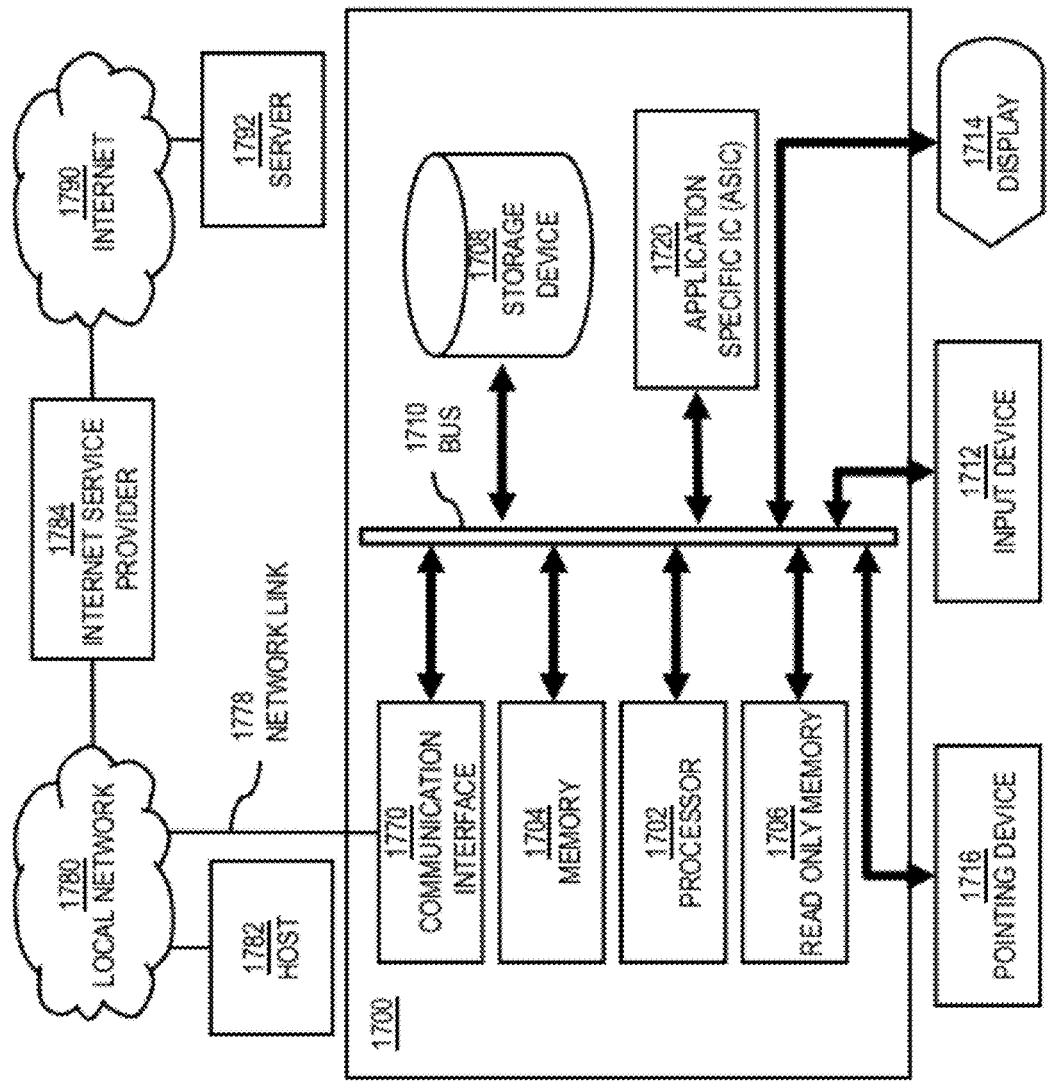
FIG. 17 is a diagram of hardware that can be used to implement an embodiment of the invention.

FIG. 17 illustrates a computer system 1700 upon which an embodiment of the invention may be implemented. Although computer system 1700 is depicted with respect to a particular device or equipment, it is contemplated that other devices or equipment (e.g., network elements, servers, etc.) within FIG. 17 can deploy the illustrated hardware and components of system 1700. Computer system 1700 is programmed (e.g., via computer program code or instructions) to determine and utilize geographical locations contextually relevant to a user as described herein and includes a communication mechanism such as a bus 1710 for passing information between other internal and external components of the computer system 1700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1700, or a portion thereof, constitutes a means for performing one or more steps of determining and utilizing geographical locations contextually relevant to a user.

A bus 1710 includes one or more parallel conductors of information so that information is transferred quickly among devices coupled to the bus 1710. One or more processors 1702 for processing information are coupled with the bus 1710.

A processor (or multiple processors) 1702 performs a set of operations on information as specified by computer program code related to determine and utilize geographical locations contextually relevant to a user. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1710 and placing information on the bus 1710. The set of operations also typically include comparing two or more units of information, shifting positions of units of information, and combining two or more units of information, such as by addition or multiplication or logical operations like OR, exclusive OR (XOR), and AND.

Each operation of the set of operations that can be performed by the processor is represented to the processor by information called instructions, such as an operation code of one or more digits. A sequence of operations to be executed by the processor 1702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1700 also includes a memory 1704 coupled to bus 1710. The memory 1704, such as a random access memory (RAM) or other dynamic storage device, stores information including processor instructions for determining and utilizing geographical locations contextually relevant to a user. Dynamic memory allows information stored therein to be changed by the computer system 1700. RAM allows a unit of information stored at a location called a memory address to be stored and retrieved independently of information at neighboring addresses. The memory 1704 is also used by the processor 1702 to store temporary values during execution of processor instructions. The computer system 1700 also includes a read only memory (ROM) 1706 or other static storage device coupled to the bus 1710 for storing static information, including instructions, that is not changed by the computer system 1700. Some memory is composed of volatile storage that loses the information stored thereon when power is lost. Also coupled to bus 1710 is a non-volatile (persistent) storage device 1708, such as a magnetic disk, optical disk or flash card, for storing information, including instructions, that persists even when the computer system 1700 is turned off or otherwise loses power.

Information, including instructions for determining and utilizing geographical locations contextually relevant to a user, is provided to the bus 1710 for use by the processor from an external input device 1712, such as a keyboard containing alphanumeric keys operated by a human user, or a sensor. A sensor detects conditions in its vicinity and transforms those detections into physical expression compatible with the measurable phenomenon used to represent information in computer system 1700. Other external devices coupled to bus 1710, used primarily for interacting with humans, include a display device 1714, such as a cathode ray tube (CRT) or a liquid crystal display (LCD), or plasma screen or printer for presenting text or images, and a pointing device 1716, such as a mouse or a trackball or cursor direction keys, or motion sensor, for controlling a position of a small cursor image presented on the display 1714 and issuing commands associated with graphical elements presented on the display 1714. In some embodiments, for example, in embodiments in which the computer system 1700 performs all functions automatically without human input, one or more of external input device 1712, display device 1714 and pointing device 1716 is omitted.

In the illustrated embodiment, special purpose hardware, such as an application specific integrated circuit (ASIC) 1720, is coupled to bus 1710. The special purpose hardware is configured to perform operations not performed by processor 1702 quickly enough for special purposes. Examples of application specific ICs include graphics accelerator cards for generating images for display 1714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1700 also includes one or more instances of a communications interface 1770 coupled to bus 1710. Communication interface 1770 provides a one-way or two-way communication coupling to a variety of external devices that operate with their own processors, such as printers, scanners and external disks. In general the coupling is with a network link 1778 that is connected to a local network 1780 to which a variety of external devices with their own processors are connected. For example, communication interface 1770 may be a parallel port or a serial port or a universal serial bus (USB) port on a personal computer. In some embodiments, communications interface 1770 is an integrated services digital network (ISDN) card or a digital subscriber line (DSL) card or a telephone modem that provides an information communication connection to a corresponding type of telephone line. In some embodiments, a communication interface 1770 is a cable modem that converts signals on bus 1710 into signals for a communication connection over a coaxial cable or into optical signals for a communication connection over a fiber optic cable. As another example, communications interface 1770 may be a local area network (LAN) card to provide a data communication connection to a compatible LAN, such as Ethernet. Wireless links may also be implemented. For wireless links, the communications interface 1770 sends or receives or both sends and receives electrical, acoustic or electromagnetic signals, including infrared and optical signals, that carry information streams, such as digital data. For example, in wireless handheld devices, such as mobile telephones like cell phones, the communications interface 1770 includes a radio band electromagnetic transmitter and receiver called a radio transceiver. In certain embodiments, the communications interface 1770 enables connection to the communication network 105 for determining and utilizing geographical locations contextually relevant to a user to the UE 101.

The term "computer-readable medium" as used herein refers to any medium that participates in providing information to processor 1702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1708. Volatile media include, for example, dynamic memory 1704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1720.

Network link 1778 typically provides information communication using transmission media through one or more networks to other devices that use or process the information. For example, network link 1778 may provide a connection through local network 1780 to a host computer 1782 or to equipment 1784 operated by an Internet Service Provider (ISP). ISP equipment 1784 in turn provides data communication services through the public, world-wide packet-switching communication network of networks now commonly referred to as the Internet 1790.

A computer called a server host 1792 connected to the Internet hosts a process that provides a service in response to information received over the Internet. For example, server host 1792 hosts a process that provides information representing video data for presentation at display 1714. It is contemplated that the components of system 1700 can be deployed in various configurations within other computer systems, e.g., host 1782 and server 1792.

At least some embodiments of the invention are related to the use of computer system 1700 for implementing some or all of the techniques described herein. According to one embodiment of the invention, those techniques are performed by computer system 1700 in response to processor 1702 executing one or more sequences of one or more processor instructions contained in memory 1704. Such instructions, also called computer instructions, software and program code, may be read into memory 1704 from another computer-readable medium such as storage device 1708 or network link 1778. Execution of the sequences of instructions contained in memory 1704 causes processor 1702 to perform one or more of the method steps described herein. In alternative embodiments, hardware, such as ASIC 1720, may be used in place of or in combination with software to implement the invention. Thus, embodiments of the invention are not limited to any specific combination of hardware and software, unless otherwise explicitly stated herein.

The signals transmitted over network link 1778 and other networks through communications interface 1770, carry information to and from computer system 1700. Computer system 1700 can send and receive information, including program code, through the networks 1780, 1790 among others, through network link 1778 and communications interface 1770. In an example using the Internet 1790, a server host 1792 transmits program code for a particular application, requested by a message sent from computer 1700, through Internet 1790, ISP equipment 1784, local network 1780 and communications interface 1770. The received code may be executed by processor 1702 as it is received, or may be stored in memory 1704 or in storage device 1708 or other non-volatile storage for later execution, or both. In this manner, computer system 1700 may obtain application program code in the form of signals on a carrier wave.

Various forms of computer readable media may be involved in carrying one or more sequence of instructions or data or both to processor 1702 for execution. For example, instructions and data may initially be carried on a magnetic disk of a remote computer such as host 1782. The remote computer loads the instructions and data into its dynamic memory and sends the instructions and data over a telephone line using a modem. A modem local to the computer system 1700 receives the instructions and data on a telephone line and uses an infra-red transmitter to convert the instructions and data to a signal on an infra-red carrier wave serving as the network link 1778. An infrared detector serving as communications interface 1770 receives the instructions and data carried in the infrared signal and places information representing the instructions and data onto bus 1710. Bus 1710 carries the information to memory 1704 from which processor 1702 retrieves and executes the instructions using some of the data sent with the instructions. The instructions and data received in memory 1704 may optionally be stored on storage device 1708, either before or after execution by the processor 1702.

FIG. 18 illustrates a chip set or chip 1800 upon which an embodiment of the invention may be implemented. Chip set 1800 is programmed to determine and utilize geographical locations contextually relevant to a user as described herein and includes, for instance, the processor and memory components described with respect to FIG. 17 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1800 can be implemented in a single chip. It is further contemplated that in certain embodiments the chip set or chip 1800 can be implemented as a single "system on a chip." It is further contemplated that in certain embodiments a separate ASIC would not be used, for example, and that all relevant functions as disclosed herein would be performed by a processor or processors. Chip set or chip 1800, or a portion thereof, constitutes a means for performing one or more steps of providing user interface navigation information associated with the availability of functions. Chip set or chip 1800, or a portion thereof, constitutes a means for performing one or more steps of determining and utilizing geographical locations contextually relevant to a user.

In one embodiment, the chip set or chip 1800 includes a communication mechanism such as a bus 1801 for passing information among the components of the chip set 1800. A processor 1803 has connectivity to the bus 1801 to execute instructions and process information stored in, for example, a memory 1805. The processor 1803 may include one or more processing cores with each core configured to perform independently. A multi-core processor enables multiprocessing within a single physical package. Examples of a multi-core processor include two, four, eight, or greater numbers of processing cores. Alternatively or in addition, the processor 1803 may include one or more microprocessors configured in tandem via the bus 1801 to enable independent execution of instructions, pipelining, and multithreading. The processor 1803 may also be accompanied with one or more specialized components to perform certain processing functions and tasks such as one or more digital signal processors (DSP) 1807, or one or more application-specific integrated circuits (ASIC) 1809. A DSP 1807 typically is configured to process real-world signals (e.g., sound) in real time independently of the processor 1803. Similarly, an ASIC 1809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1800 includes merely one or more processors and some software and/or firmware supporting and/or relating to and/or for the one or more processors.

The processor 1803 and accompanying components have connectivity to the memory 1805 via the bus 1801. The memory 1805 includes both dynamic memory (e.g., RAM, magnetic disk, writable optical disk, etc.) and static memory (e.g., ROM, CD-ROM, etc.) for storing executable instructions that when executed perform the inventive steps described herein to determine and utilize geographical locations contextually relevant to a user. The memory 1805 also, stores the data associated with or generated by the execution of the inventive steps.

Figure 19:
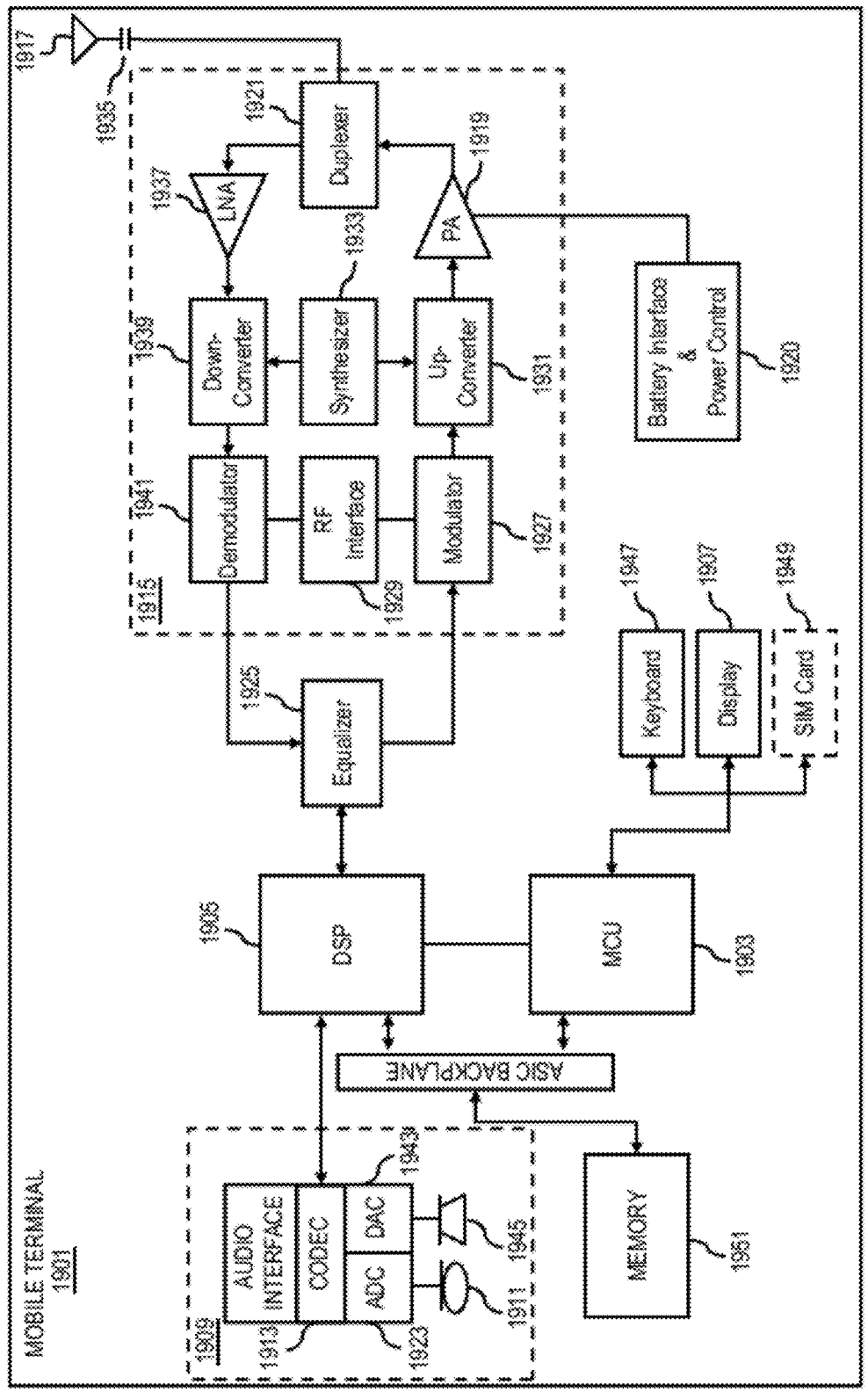
FIG. 19 is a diagram of a mobile terminal (e.g., a handset) that can be used to implement an embodiment of the invention.

FIG. 19 is a diagram of exemplary components of a mobile terminal (e.g., handset) for communications, which is capable of operating in the system of FIG. 1, according to one embodiment. In some embodiments, mobile terminal 1901, or a portion thereof, constitutes a means for performing one or more steps of determining and utilizing geographical locations contextually relevant to a user. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1903, a Digital Signal Processor (DSP) 1905, and a receiver/transmitter unit including a microphone gain control unit and a speaker gain control unit. A main display unit 1907 provides a display to the user in support of various applications and mobile terminal functions that perform or support the steps of determining and utilizing geographical locations contextually relevant to a user. The display 1907 includes display circuitry configured to display at least a portion of a user interface of the mobile terminal (e.g., mobile telephone). Additionally, the display 1907 and display circuitry are configured to facilitate user control of at least some functions of the mobile terminal. An audio function circuitry 1909 includes a microphone 1911 and microphone amplifier that amplifies the speech signal output from the microphone 1911. The amplified speech signal output from the microphone 1911 is fed to a coder/decoder (CODEC) 1913.

A radio section 1915 amplifies power and converts frequency in order to communicate with a base station, which is included in a mobile communication system, via antenna 1917. The power amplifier (PA) 2019 and the transmitter/modulation circuitry are operationally responsive to the MCU 1903, with an output from the PA 1919 coupled to the duplexer 1921 or circulator or antenna switch, as known in the art. The PA 1919 also couples to a battery interface and power control unit 1919.

In use, a user of mobile terminal 1901 speaks into the microphone 1911 and his or her voice along with any detected background noise is converted into an analog voltage. The analog voltage is then converted into a digital signal through the Analog to Digital Converter (ADC) 1923. The control unit 1903 routes the digital signal into the DSP 1905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1925 for compensation of any frequency-dependent impairments that occur during transmission though the air such as phase and amplitude distortion. After equalizing the bit stream, the modulator 1927 combines the signal with a RF signal generated in the RF interface 1929. The modulator 1927 generates a sine wave by way of frequency or phase modulation. In order to prepare the signal for transmission, an up-converter 1931 combines the sine wave output from the modulator 1927 with another sine wave generated by a synthesizer 1933 to achieve the desired frequency of transmission. The signal is then sent through a PA 1919 to increase the signal to an appropriate power level. In practical systems, the PA 1919 acts as a variable gain amplifier whose gain is controlled by the DSP 1905 from information received from a network base station. The signal is then filtered within the duplexer 1921 and optionally sent to an antenna coupler 1935 to match impedances to provide maximum power transfer. Finally, the signal is transmitted via antenna 1917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1901 are received via antenna 1917 and immediately amplified by a low noise amplifier (LNA) 1937. A down-converter 1939 lowers the carrier frequency while the demodulator 1941 strips away the RF leaving only a digital bit stream. The signal then goes through the equalizer 1925 and is processed by the DSP 1905. A Digital to Analog Converter (DAC) 1943 converts the signal and the resulting output is transmitted to the user through the speaker 1945, all under control of a Main Control Unit (MCU) 1903—which can be implemented as a Central Processing Unit (CPU) (not shown).

The MCU 1903 receives various signals including input signals from the keyboard 1947. The keyboard 1947 and/or the MCU 1903 in combination with other user input components (e.g., the microphone 1911) comprise a user interface circuitry for managing user input. The MCU 1903 runs a user interface software to facilitate user control of at least some functions of the mobile terminal 1901 to determine and utilize geographical locations contextually relevant to a user. The MCU 1903 also delivers a display command and a switch command to the display 1907 and to the speech output switching controller, respectively. Further, the MCU 1903 exchanges information with the DSP 1905 and can access an optionally incorporated SIM card 1949 and a memory 1951. In addition, the MCU 1903 executes various control functions required of the terminal. The DSP 1905 may, depending upon the implementation, perform any of a variety of conventional digital processing functions on the voice signals. Additionally, DSP 1905 determines the background noise level of the local environment from the signals detected by microphone 1911 and sets the gain of microphone 1911 to a level selected to compensate for the natural tendency of the user of the mobile terminal 1901.

The CODEC 1913 includes the ADC 1923 and DAC 1943. The memory 1951 stores various data including call incoming tone data and is capable of storing other data including music data received via, e.g., the global Internet. The software module could reside in RAM memory, flash memory, registers, or any other form of writable storage medium known in the art. The memory device 1951 may be, but not limited to, a single memory, CD, DVD, ROM, RAM, EEPROM, optical storage, or any other non-volatile storage medium capable of storing digital data.

An optionally incorporated SIM card 1949 carries, for instance, important information, such as the cellular phone number, the carrier supplying service, subscription details, and security information. The SIM card 1949 serves primarily to identify the mobile terminal 1901 on a radio network. The card 1949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a plurality of location points associated with a user, at least one device associated with the user, or a combination thereof;
   at least one determination of a plurality of stationary points based, at least in part, on the plurality of location points, wherein the stationary points refer to clusters of location points of geographical regions in which the user remains substantially stationary for some predetermined period of time;
   context data associated with the plurality of stationary points; and
   at least one determination of at least one location anchor based, at least in part, on the plurality of stationary points and the associated context data,
   wherein the at least one location anchor is represented using coordinates of a centroid of a cluster of the stationary points, and minimum and maximum coordinates of the stationary points belonging to the cluster of stationary points.

2. A method of claim 1, wherein the (1) data and/or (2) information and/or (3) at least one signal are further based, at least in part, on the following:
   at least one determination of one or more clusters of at least a portion of the stationary points within at least one predetermined boundary based, at least in part, on one or more predetermined criteria;
   at least one determination of respective contextual relevance of the one or more clusters of stationary points based, at least in part, on the associated context data; and
   at least one determination of the at least one location anchor based, at least in part, on the respective context relevance of the one or more clusters of stationary points.

3. A method of claim 2, wherein the predetermined boundary is of varying size, varying shape, or a combination thereof.

4. A method of claim 2, wherein the one or more predetermined criteria include one or more temporal criteria, one or more spatial criteria, or a combination thereof.

5. A method of claim 1, wherein at least two location anchors are determined, and wherein the (1) data and/or (2) information and/or (3) at least one signal are further based, at least in part, on the following:
   a hierarchy of the at least two location anchors.

6. A method of claim 5, wherein at least a portion of the at least two location anchors at least partially overlap.

7. A method of claim 1, wherein the (1) data and/or (2) information and/or (3) at least one signal are further based, at least in part, on the following:
   content, functions, or a combination thereof associated with one or more applications, one or more services, or a combination thereof; and
   at least one determination to cause, at least in part, presentation of the content, functions, or a combination thereof with respect to the at least one location anchor.

8. A method of claim 7, wherein the (1) data and/or (2) information and/or (3) at least one signal are further based, at least in part, on the following:
   at least one determination to cause, at least in part, transmission of at least a portion of the content, the functions, or a combination thereof to the at least one device.

9. A method of claim 1, wherein the determination of the plurality of location points, the plurality of stationary points, the context data, the at least one location anchor, or a combination thereof is performed continuously, periodically, according to a schedule, or a combination thereof.

10. An apparatus comprising:
    at least one processor; and
    at least one memory including computer program code for one or more programs, the at least one memory and the computer program code configured to, with the at least one processor, cause the apparatus to perform at least the following,
    cause, at least in part, a local and/or remote determination of a plurality of location points associated with a user, at least one device associated with the user, or a combination thereof;
    cause, at least in part, a local and/or remote determination of a plurality of stationary points based, at least in part, on the plurality of location points, wherein the stationary points refer to clusters of location points of geographical regions in which the user remains substantially stationary for some predetermined period of time;
    cause, at least in part, a local and/or remote determination of context data associated with the plurality of stationary points; and
    cause, at least in part, a local and/or remote determination of at least one location anchor based, at least in part, on the plurality of stationary points and the associated context data,
    wherein the at least one location anchor is represented using coordinates of a centroid of a cluster of the stationary points, and minimum and maximum coordinates of the stationary points belonging to the cluster of stationary points.

11. An apparatus of claim 10, wherein the apparatus is further caused to:

cause, at least in part, a local and/or remote determination of one or more clusters of at least a portion of the stationary points within at least one predetermined boundary based, at least in part, on one or more predetermined criteria;

cause, at least in part, a local and/or remote determination of respective contextual relevance of the one or more clusters of stationary points based, at least in part, on the associated context data; and cause, at least in part, a local and/or remote determination of the at least one location anchor based, at least in part, on the respective context relevance of the one or more clusters of stationary points.

12. An apparatus of claim 11, wherein the predetermined boundary is of varying size, varying shape, or a combination thereof.

13. An apparatus of claim 11, wherein the one or more predetermined criteria include one or more temporal criteria, one or more spatial criteria, or a combination thereof.

14. An apparatus of claim 10, wherein at least two location anchors are determined, and the apparatus is further caused to:

cause, at least in part, a local and/or remote determination of a hierarchy of the at least two location anchors.

15. An apparatus of claim 14, wherein at least a portion of the at least two location anchors at least partially overlap.

16. An apparatus of claim 10, wherein the apparatus is further caused to:

cause, at least in part, a local and/or remote determination of content, functions, or a combination thereof associated with one or more applications, one or more services, or a combination thereof; and determine to cause, at least in part, presentation of the content, functions, or a combination thereof with respect to the at least one location anchor.

17. An apparatus of claim 16, wherein the apparatus is further caused to:

determining to cause, at least in part, transmission of at least a portion of the content, the functions, or a combination thereof to the at least one device.

18. An apparatus of claim 10, wherein the local and/or remote determination of the plurality of location points, the plurality of stationary points, the context data, the at least one location anchor, or a combination thereof is performed continuously, periodically, according to a schedule, or a combination thereof.

* * * * *